United States Patent
Cruz et al.

(10) Patent No.: US 11,814,287 B2
(45) Date of Patent: *Nov. 14, 2023

(54) METHOD OF PRODUCING A HYDROGEN-ENRICHED PRODUCT AND RECOVERING $CO_2$ IN A HYDROGEN PRODUCTION PROCESS UNIT

(71) Applicant: UOP LLC, Des Plaines, IL (US)

(72) Inventors: Addison Cruz, Chicago, IL (US); Bradley Russell, Carol Stream, IL (US); Erick J. Bennett, III, Orland Park, IL (US); Kurt Kraus, Tulsa, OK (US); Stefano Bietto, Tulsa, OK (US); William Cady, Chicago, IL (US); Kyle Cuellar, Fulshear, TX (US); Oluwaseyi Kayode, Houston, TX (US)

(73) Assignee: UOP LLC, Des Plaines, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/451,937

(22) Filed: Oct. 22, 2021

(65) Prior Publication Data
US 2022/0306463 A1     Sep. 29, 2022

Related U.S. Application Data

(60) Provisional application No. 63/167,338, filed on Mar. 29, 2021.

(51) Int. Cl.
*C01B 3/38* (2006.01)
*C01B 3/48* (2006.01)
(Continued)

(52) U.S. Cl.
CPC .............. *C01B 3/382* (2013.01); *B01D 3/143* (2013.01); *B01D 53/047* (2013.01);
(Continued)

(58) Field of Classification Search
CPC ........... C01B 3/382; C01B 3/386; C01B 3/48; C01B 3/508; C01B 32/50;
(Continued)

(56) References Cited

U.S. PATENT DOCUMENTS 4,300,009 A     11/1981  Haag et al.
4,772,420 A *   9/1988  Pinto .................. C01B 3/56
                                                 252/376

(Continued)

FOREIGN PATENT DOCUMENTS

FR     2961802 A1    12/2011
WO  2007123673 A1    11/2007
WO  2019133598 A1     7/2019

OTHER PUBLICATIONS

Craus, Kurt et al., U.S. Appl. No. 63/167,286 entitled "Active And Passive Combustion Stabilization For Burners For Highly And Rapidly Varying Fuel Gas Compositions" filed Oct. 22, 2021.

(Continued)

*Primary Examiner* — Steven J Bos
*Assistant Examiner* — Syed T Iqbal

(57) ABSTRACT

A process and apparatus for producing a hydrogen-enriched product and recovering $CO_2$ from an effluent stream from a hydrogen production process unit are described. The process utilizes a $CO_2$ recovery system integrated with a PSA system that produces at least two product streams to recover additional hydrogen and $CO_2$ from the tail gas stream of a hydrogen PSA unit in the hydrogen production process.

20 Claims, 7 Drawing Sheets

(51) Int. Cl.
| | |
|---|---|
| *C01B 32/50* | (2017.01) |
| *B01D 53/047* | (2006.01) |
| *B01D 3/14* | (2006.01) |
| *B01D 53/26* | (2006.01) |
| *B01D 53/04* | (2006.01) |
| *C01B 3/50* | (2006.01) |

(52) U.S. Cl.
CPC ......... *B01D 53/0438* (2013.01); *B01D 53/26* (2013.01); *C01B 3/386* (2013.01); *C01B 3/48* (2013.01); *C01B 3/508* (2013.01); *C01B 32/50* (2017.08); *B01D 2256/16* (2013.01); *B01D 2256/22* (2013.01); *B01D 2257/102* (2013.01); *B01D 2257/108* (2013.01); *B01D 2257/11* (2013.01); *B01D 2257/502* (2013.01); *B01D 2257/504* (2013.01); *B01D 2257/7025* (2013.01); *B01D 2257/80* (2013.01); *B01D 2259/402* (2013.01); *B01D 2259/4003* (2013.01); *B01D 2259/40015* (2013.01); *B01D 2259/40043* (2013.01); *B01D 2259/40079* (2013.01); *B01D 2259/40081* (2013.01); *C01B 2203/0233* (2013.01); *C01B 2203/0261* (2013.01); *C01B 2203/0283* (2013.01); *C01B 2203/042* (2013.01); *C01B 2203/0833* (2013.01); *C01B 2203/1241* (2013.01); *C01B 2203/1288* (2013.01); *C01B 2203/148* (2013.01); *C01B 2203/1628* (2013.01)

(58) Field of Classification Search
CPC .... C01B 2203/0233; C01B 2203/0261; C01B 2203/0283; C01B 2203/042; C01B 2203/0833; C01B 2203/1241; C01B 2203/1288; C01B 2203/148; C01B 2203/1628; B01D 3/143; B01D 53/0438; B01D 53/047; B01D 53/26; B01D 2256/16; B01D 2256/22; B01D 2257/102; B01D 2257/108; B01D 2257/11; B01D 2257/502; B01D 2257/504; B01D 2257/7025; B01D 2257/80; B01D 2259/40015; B01D 2259/4003; B01D 2259/40043; B01D 2259/40079; B01D 2259/40081; B01D 2259/402; F25J 3/0266

See application file for complete search history.

(56) References Cited

U.S. PATENT DOCUMENTS

| | | |
|---|---|---|
| 4,963,339 A | 10/1990 | Krishnamurthy et al. |
| 4,992,605 A | 2/1991 | Craig et al. |
| 6,875,008 B1 | 4/2005 | Martin et al. |
| 7,776,208 B2 | 8/2010 | Guo |
| 7,999,142 B2 | 8/2011 | Kalnes et al. |
| 8,021,464 B2 | 9/2011 | Gauthier et al. |
| 8,039,682 B2 | 10/2011 | McCall et al. |
| 8,198,492 B2 | 6/2012 | Brady et al. |
| 8,241,400 B2 | 8/2012 | Grover |
| 8,394,174 B2 | 3/2013 | Chen et al. |
| 8,431,755 B2 | 4/2013 | Vauk |
| 8,742,183 B2 | 6/2014 | McCall et al. |
| 8,865,953 B2 | 10/2014 | Brady et al. |
| 9,062,258 B2 | 6/2015 | Mayeur et al. |
| 11,326,110 B2 | 5/2022 | Roy et al. |
| 2004/0230085 A1 | 11/2004 | Jakkula et al. |
| 2010/0288123 A1 | 11/2010 | Chen et al. |
| 2012/0121497 A1 | 5/2012 | Terrien et al. |
| 2015/0376801 A1 | 12/2015 | Bairamijamal |
| 2016/0250580 A1* | 9/2016 | Monereau ............ B01D 53/047 95/139 |
| 2016/0312125 A1 | 10/2016 | Linck |
| 2018/0216010 A1 | 8/2018 | Hong |
| 2019/0135626 A1* | 5/2019 | Rafati .................... F25J 3/0295 |
| 2019/0275460 A1 | 9/2019 | Zhong et al. |

OTHER PUBLICATIONS

International Search Report from corresponding PCT application No. PCT/US2022/071385, dated Jul. 6, 2022.
International Search Report from PCT application No. PCT/US2022/071384, dated Jul. 6, 2022.
International Search Report from PCT application No. PCT/US2022/071386 dated Jul. 13, 2022.
Written Opinion from PCT application No. PCT/US2022/071386 dated Jul. 13, 2022.
International Search Report from PCT application No. PCT/US2022/071388 dated Jul. 14, 2022.
Written Opinion from PCT application No. PCT/US2022/071388 dated Jul. 14, 2022.

* cited by examiner

METHOD OF PRODUCING A HYDROGEN-ENRICHED PRODUCT AND RECOVERING $CO_2$ IN A HYDROGEN PRODUCTION PROCESS UNIT

RELATED APPLICATIONS

This application claims the benefit of U.S. Provisional Application Ser. No. 63/167,338, filed Mar. 29, 2021, entitled Method of Producing Hydrogen and Recovering $CO_2$ in a Hydrogen Production Process Unit, which is incorporated herein in its entirety.

BACKGROUND

Hydrogen is expected to have significant growth potential because it is a clean-burning fuel. However, hydrogen production is traditionally a significant emitter of $CO_2$, and government regulations and societal pressures are increasingly taxing or penalizing $CO_2$ emissions or incentivizing $CO_2$ capture. Consequently, significant competition to lower the cost of hydrogen production while recovering the byproduct $CO_2$ for subsequent geological sequestration to capture the growing market is anticipated. $CO_2$ can be separated as a vapor to be supplied to a common pipeline, but more likely it will need to be produced in liquefied form for easy transport by truck or ship due to the current lack of $CO_2$ pipeline infrastructure in certain areas of the world.

The desired level of $CO_2$ emissions mitigated will depend on regional economic conditions, with some hydrogen producers prioritizing maximizing hydrogen production with $CO_2$ capture, others prioritizing minimal $CO_2$ emissions with hydrogen production, and some falling somewhere in-between. Another important factor is the reformer technology chosen for a given hydrogen production unit. For steam reforming plants, 50% to 60% $CO_2$ capture may be sufficient, while greater than 90% or greater than 95% may be expected for an autothermal reformer (ATR), gasifier, or partial oxidation (PDX) reformer.

Most existing hydrogen production processes utilize pressure swing adsorption (PSA) to recover high-purity product hydrogen from shifted syngas. The low-pressure tail gas stream from the PSA unit is typically combusted to generate heat or steam for the process. If no stream is sent to a combustor, a purge is required to prevent impurity build-up in the process.

U.S. Pat. No. 8,021,464 describes a process for the combined production of hydrogen and $CO_2$ from a mixture of hydrocarbons which are converted to syngas. The syngas is separated in a PSA unit into a hydrogen-enriched stream and a PSA offgas stream. The PSA offgas is compressed and dried, followed by several successive steps of condensing and separating the $CO_2$-rich condensate with the temperature being reduced at each step, the temperature ranging from ambient to −56° C. However, the process results in a purge stream containing a significant amount of $CO_2$ which must be removed from the process. A permeate module can be used to improve the separation, but at the cost of increased power requirements.

U.S. Pat. No. 8,241,400 describes a process for recovering hydrogen and $CO_2$ from a mixture of hydrocarbons utilizing a system that includes a reformer unit, an optional water gas shift reactor, a PSA unit, and a cryogenic purification unit or a catalytic oxidizer. The PSA unit produces three streams: a high pressure hydrogen stream, a low pressure $CO_2$ stream, and a $CH_4$ rich stream which is withdrawn during a $CO_2$ co-purge step. Purified $CO_2$ from the $CO_2$ purification unit in the process is used as the co-purge in the PSA unit. The adsorption step is run at a pressure of about 250 psig to about 700 psig. The pressure during the co-purge step is in the range of about 300 psig to about 800 psig, and the $CO_2$ co-purge stream is preferably introduced at a pressure higher than the pressure during the adsorption step.

The use of a second high-pressure feed stream (the $CO_2$ co-purge stream) increases the cost and complexity of the process in U.S. Pat. No. 8,241,400. The necessity of having a segmented adsorber (or two separate vessels) with an isolation valve between the two and an intermediate side-draw further increases the cost and complexity of the process.

Therefore, there is a need for improved hydrogen production processes with improved, cost-effective $CO_2$ recovery.

DETAILED DESCRIPTION

Figure 1:
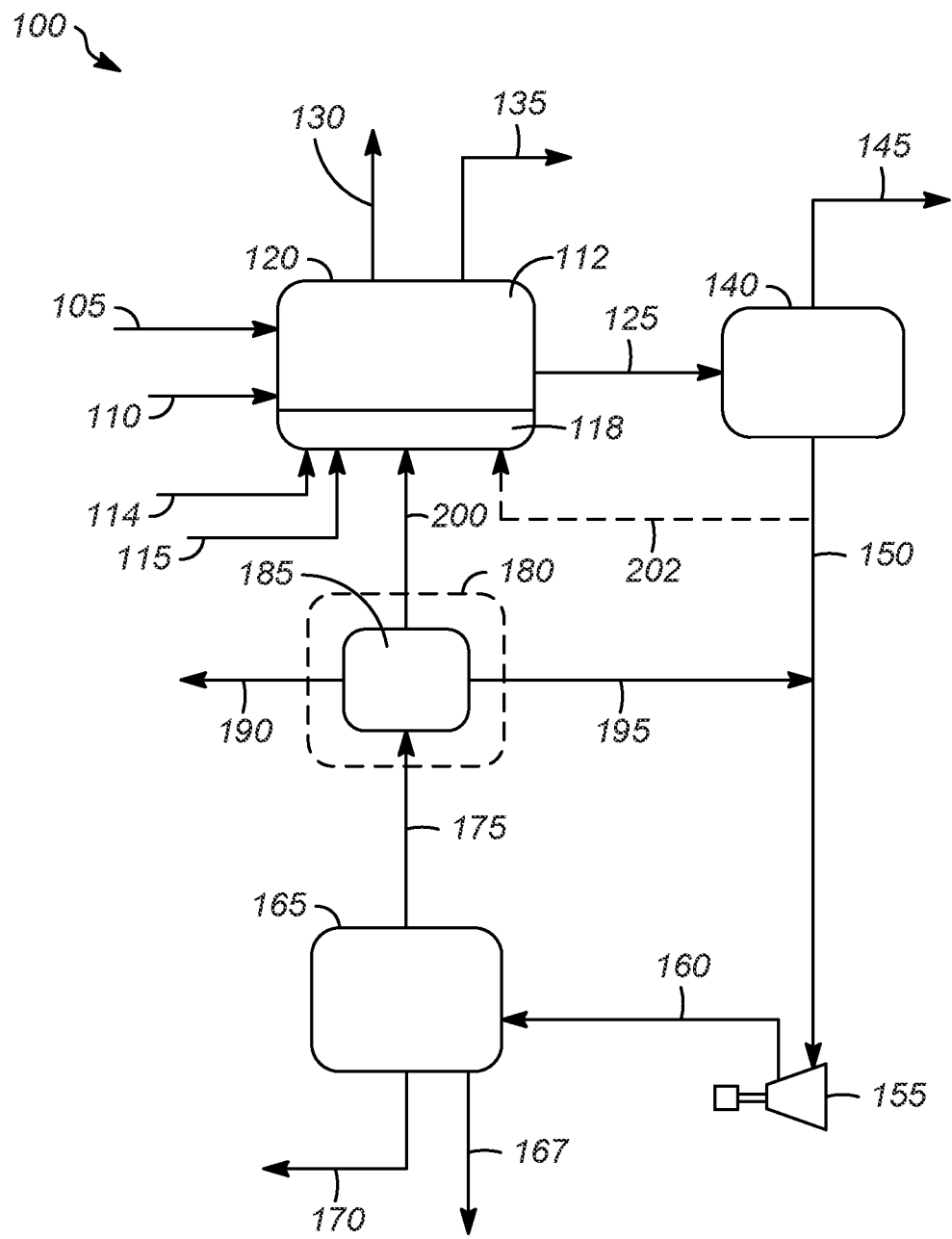
FIG. 1 is an illustration of one embodiment of a method of producing hydrogen and recovering $CO_2$ from a steam reforming process unit using a PSA system that produces at least two product streams of the present invention.

The process produces a hydrogen-enriched product and allows recovery of $CO_2$ from the effluent stream of a hydrogen production process unit. It uses a PSA system that produces at least two product streams to recover a hydrogen-enriched product from the tail gas stream from a hydrogen separation unit in a hydrogen production process. The process utilizes a $CO_2$ recovery system integrated with the PSA that produces with at least two product streams to recover additional hydrogen and high-purity liquid $CO_2$.

Extracting a hydrogen-enriched product (and in some embodiments a pure hydrogen product) directly from the overhead stream of the $CO_2$ recovery system with the PSA system that produces at least two product streams has the potential to provide an economic advantage over systems that use recycle configurations. The additional hydrogen production substantially improves the process economics. Using a PSA system that produces at least two product streams on the $CO_2$ recovery system overhead stream also avoids non-permeate losses of $CO_2$ which occur with the use of a membrane separation process. Utilizing a PSA system that produces at least two product streams offers innovation and flexibility, reducing downstream equipment size and utilities, and increasing $CO_2$ captured (since the impurity-rich purge stream contains no significant $CO_2$).

The hydrogen production process unit may comprise a new or existing steam reforming unit with an optional gas heated reformer, an autothermal reforming unit with an optional gas heated reformer, a gasification unit, or a partial oxidation (PDX) unit. The hydrogen production process produces an effluent which comprises a mixture of gases comprising hydrogen, carbon dioxide, water, and at least one of methane, carbon monoxide, nitrogen, and argon.

The effluent stream is initially sent to a hydrogen pressure swing adsorption (PSA) unit for separation into a high-pressure hydrogen stream enriched in hydrogen and a hydrogen depleted tail gas stream comprising the remaining hydrogen, carbon dioxide, water, and the at least one of the methane, carbon monoxide, nitrogen, and argon. The high-pressure hydrogen stream contains about 90% of the hydrogen in the effluent, which is recovered.

The hydrogen depleted tail gas stream is compressed and sent to a $CO_2$ recovery system where it is separated into a liquid $CO_2$ product and an overhead stream comprising the hydrogen, and some carbon dioxide, and some of the at least one of the methane, carbon monoxide, nitrogen, and argon.

The overhead stream is sent to the PSA system that produces at least two product streams. The PSA system that produces at least two product streams separates the overhead stream into at least two streams: a second high-pressure hydrogen stream, and a low-pressure $CO_2$ stream. The high-pressure hydrogen stream is enriched in hydrogen. The low-pressure $CO_2$ stream is enriched in carbon dioxide. The second high-pressure hydrogen stream is recovered, and the low-pressure $CO_2$ stream is recycled to the compressor.

In some embodiments, the process allows recovery of about 80 to about 90% of the hydrogen in the tail gas stream from the hydrogen PSA unit, as well as capture of substantially all (e.g., about 95% to about 100%) of the $CO_2$.

The effluent from the hydrogen production process unit that is fed to the hydrogen PSA system is typically in the range of about 20° C. to about 60° C., or about 30° C. to about 50° C., or about 40° C. (or any combination of temperature ranges). The pressure is typically in the range of about 2,000 to about 5,000 kPa.

The effluent is separated in a hydrogen PSA unit into a high-pressure hydrogen steam and a tail gas stream. The high-pressure hydrogen stream contains about 80% to about 90% of the hydrogen in the effluent. The high-pressure hydrogen stream is typically at a pressure in the range of about 2,000 to about 5,000 kPa.

The tail gas stream from the hydrogen PSA unit, which contains about 10% to about 20% of the hydrogen in the effluent stream, carbon dioxide, water, and the at least one of the methane, carbon monoxide, nitrogen, and argon, is at a pressure in the range of about 100 to about 200 kPa.

The tail gas stream is compressed to a pressure in the range of about 3,000 to about 6,000 kPa and sent to a $CO_2$ recovery system. The compressed tail gas stream is dried and cooled to a temperature of about −20° C. to about −50° C. It is separated into a $CO_2$-enriched stream and an overhead stream containing the hydrogen, some of the carbon dioxide, and some of the at least one of the methane, carbon monoxide, nitrogen, and argon. In some embodiments, the $CO_2$-enriched stream comprises substantially all (e.g., about 95% to about 100%) of the $CO_2$ in the tail gas stream from the hydrogen PSA unit, and is substantially free of hydrogen, methane, carbon monoxide, nitrogen, and argon. In some embodiments, the $CO_2$-enriched stream comprises about 95.0 mol % $CO_2$ or more, about 98.0 mol % $CO_2$ or more, or about 98.5 mol % $CO_2$ or more, or about 99.0 mol % $CO_2$ or more, or about 99.5 mol % $CO_2$ or more, or about 99.9 mol % $CO_2$ or more.

The $CO_2$ recovery system may include a distillation column, with the $CO_2$-enriched product stream being recovered from the bottom of the column and the lighter components (hydrogen, methane, nitrogen, etc.) being recovered from the top of the column. The $CO_2$ recovery system may instead or also include a single or multiple successive flash vapor-liquid separation vessels with each separator providing in an additional theoretical stage of mass transfer, with the $CO_2$-enriched product being recovered in the liquid stream(s) and the lighter components (hydrogen, methane, nitrogen, etc.) being recovered in the overhead vapor stream(s).

The $CO_2$-enriched stream is recovered. The $CO_2$-enriched stream may be a liquid stream. In some cases, the liquid stream may then be vaporized for use, if desired.

The overhead stream is sent to the PSA system that produces at least two product streams. The PSA system that produces at least two product streams may be a three-product PSA unit with three product streams, a PSA unit with two product streams, or two PSA units each with two product streams with the product stream from the first PSA unit feeding into the second PSA unit.

The three-product PSA unit comprises four or more PSA adsorption vessels. There are generally at least six vessels, and typically eight to fourteen vessels. The vessels comprise one or more adsorbent layers, generally one to five, and typically two to three. The percentage of the bed for an adsorption layer is typically between 10% and 100%. Different layers of adsorbents have different selectivity for the components in the overhead stream, as is known to those skilled in the art. Some layers contain adsorbent that is for selective adsorption of $CO_2$ relative to methane, carbon monoxide, nitrogen, argon, and hydrogen, including, but not limited to, layers of activated alumina, silica gel, and sodium Y zeolite. Other layers contain adsorbent that is for selective adsorption of $CO_2$, methane, carbon monoxide, nitrogen, and argon relative to hydrogen, including, but not limited to, layers of activated carbon, silica gel, and molecular sieve zeolite (e.g., 5 A or sodium X zeolite). Those of skill in the art will appreciate that other zeolites could be used and will know how to select appropriate adsorbents.

There is a first opening at one end of the vessel, and a second opening at the opposite end. For convenience, the ends will be referred to as the top and the bottom of the vessel. The first opening at the bottom is selectively connected to a high-pressure feed gas inlet line, and a low-pressure tail gas outlet line. The second opening at the top of the vessel is selectively connected to a high-pressure product outlet line, an intermediate-pressure vent gas outlet line, and a low-pressure purge gas inlet line.

The feed gas enters at high pressure through the first opening at the bottom of the vessel, and a high pressure, co-current adsorption and product removal step takes place with the product exiting the vessel at high pressure through the second opening at the top of the vessel. There is at least one co-current depressurization step, and then an intermediate pressure co-current depressurization and vent gas removal step. The second stream is removed through the opening at the top of the vessel at a second pressure. There is a counter-current blowdown step and a counter-current purge step. The purge gas enters through the opening at the top of the vessel at low pressure. The $CO_2$ can be removed at low pressure through the opening at the bottom of the vessel during either or both of the counter-current blowdown step and the counter-current purge step. There is at least one counter-current re-pressurization step following the counter-current purge and tail gas removal step.

The PSA system that produces at least two product streams may comprise one PSA unit with two product streams, or two PSA units each with two product streams in series. In the single PSA unit with two product streams, the overhead stream from the $CO_2$ recovery system is introduced into the PSA unit where it is separated into a low-pressure tail gas stream enriched in $CO_2$ and a high-pressure stream enriched in hydrogen (e.g., about 85% to about 95%). It may contain a portion of the at least one of the methane, carbon monoxide, nitrogen, and argon.

With the two PSA units in series, the overhead stream from the $CO_2$ recovery system is introduced into the first PSA unit with two product streams where it is separated into a low-pressure tail gas stream enriched in $CO_2$ and a high-pressure stream comprising substantially all the hydrogen (e.g., about 85% to about 95%), and a portion of the at least one of the methane, carbon monoxide, nitrogen, and argon. The high-pressure stream is fed to the second PSA unit with two product streams where it is separated into a high-pressure hydrogen stream enriched in hydrogen and a low-pressure stream containing substantially all the methane, carbon monoxide, nitrogen, and argon (e.g., about 95% to about 100%).

The PSA system that produces at least two product streams of the present invention provides several advantages. The second stream is not removed at high pressure. With a three-product PSA unit, it is removed at an intermediate pressure between the high pressure at which the hydrogen is removed and the low pressure at which the $CO_2$ is removed, but much closer to the low pressure than to the high pressure. The intermediate pressure is typically less than about 450 kPa. When the PSA system that produces at least two product streams comprises the two PSA units, the second stream is removed at low pressure, typically less than 250 kPa.

In addition, no high-pressure co-purge stream is used. Furthermore, the vessel is not segmented; the second stream is withdrawn through the opening in the top of the vessel. Therefore, there is no need for an isolation valve and a side draw outlet between two adsorbent beds. These factors make the three-product PSA unit much less complex and less expensive to build and operate than the PSA and process of U.S. Pat. No. 8,241,400.

The temperature of the overhead stream entering the PSA system that produces at least two product streams (after chilling recovery and heat exchange) is typically in the range of about 20° C. to about 60° C., or about 30° C. to about 50° C., or about 40° C. (or any combination of temperature ranges).

The hydrogen concentration in the overhead stream fed to the PSA unit with at least two product streams is generally in the range of about 20 mol % to about 60 mol %. For example, the hydrogen concentration in an overhead gas within a $CO_2$ recovery system on a steam methane reforming plant tail gas is about 30 mol % to about 50 mol %.

In the case of the three-product PSA unit, about 80% to 90% of the hydrogen in the overhead stream is typically recovered in the high-pressure hydrogen stream, and the high pressure hydrogen stream is substantially free of $CO_2$, methane, carbon monoxide, nitrogen, and argon. It typically contains less than about 1% of the $CO_2$ relative to the overhead stream, or less than about 0.1%, or less than about 0.01%. It typically contains less than about 10% of the methane, carbon monoxide, nitrogen, and argon relative to the overhead stream, or less than about 5%, or less than about 2%, or less than about 1%, or less than about 0.1%. The high-pressure hydrogen stream is typically removed at a high pressure in the range of about 1,000 to about 6,000 kPa, or about 2,000 kPa to about 5,000 kPa, or about 2,500 kPa to about 4,500 kPa.

The low-pressure tail gas stream is typically removed at a low pressure in the range of about 50 kPa to about 250 kPa, or about 100 kPa to about 200 kPa.

The low-pressure $CO_2$ stream typically contains substantially all of the $CO_2$ (e.g., about 95% to 100%) in the overhead stream. It typically contains about 10% of the hydrogen relative to the overhead stream (e.g., about 5% to about 15%), and about 40% of the methane, carbon monoxide, nitrogen, and argon relative to the overhead stream (e.g., about 20% to about 60%).

When the PSA system that produces at least two product streams comprises a three-product PSA unit, the second gas stream is removed at an intermediate pressure between the high pressure and the low pressure, the intermediate pressure is much closer to the low pressure than the high pressure, typically within about 400 kPa of the low pressure, or 300 kPa, or 200 kPa. Typically, the intermediate pressure product stream is removed at a pressure in the range of about 150 kPa to about 450 kPa, or about 250 kPa to about 350 kPa. Although there is some overlap between the intermediate pressure range and the low pressure range, it is understood that in a particular case, the low pressure will be lower than the intermediate pressure.

The second stream typically contains about 40% to 80% of the methane, carbon monoxide, nitrogen, and argon in the overhead stream. It typically contains about 10% of the hydrogen relative to the overhead stream (e.g., about 5% to about 25%), and less than about 5% of the $CO_2$ relative to the overhead stream, or less than about 1%, or less than about 0.1%.

All or a portion of the second stream can be recycled to the hydrogen production process unit, to a water gas shift process unit, and/or to a combustion unit.

When the PSA system that produces at least two product streams comprises one PSA unit, the overhead stream is introduced into the PSA unit where it is separated into the low-pressure $CO_2$ stream containing substantially all of the $CO_2$ (about 95% to 100%) and a high-pressure stream comprising substantially all (e.g. more than 75%, or about 85% to about 95%) of the hydrogen, and a portion (about 50% to about 90%) of the at least one of the methane, the carbon monoxide, and the nitrogen, and the argon. The low-pressure $CO_2$ stream has a low pressure of about 50 kPa to about 250 kPa, or about 100 kPa to about 200 kPa. The high-pressure stream has a high pressure in the range of about 1,000 to about 6,000 kPa, or about 2,000 kPa to about 5,000 kPa, or about 2,500 kPa to about 4,500 kPa.

When the PSA system that produces at least two product streams comprises two PSA units in series, the high-pressure stream from the first PSA unit is fed into the second PSA unit where it is separated into the high-pressure hydrogen stream containing substantially all the hydrogen (e.g., about 80% to about 90%) and the second gas stream. The second gas stream comprises substantially all of the at least one of the methane, carbon monoxide, nitrogen, and argon (e.g., about 95% to about 100%) The high-pressure hydrogen stream typically has a high pressure in the range of about 1,000 to about 6,000 kPa, or about 2,000 kPa to about 5,000 kPa, or about 2,500 kPa to about 4,500 kPa. In this arrangement, the second stream has a pressure in the range of about 50 kPa to about 250 kPa, or about 100 kPa to about 200 kPa.

The first PSA unit contains adsorbent that is for selective adsorption of $CO_2$ relative to methane, carbon monoxide, nitrogen, argon, and hydrogen, including, but not limited to, layers of activated alumina, silica gel, and sodium Y zeolite. The second PSA unit contains adsorbent that is for selective adsorption of $CO_2$, methane, carbon monoxide, nitrogen, and argon relative to hydrogen, including, but not limited to, layers of activated carbon, silica gel, and molecular sieve zeolite (e.g., 5A or sodium X zeolite). Those of skill in the art will appreciate that other zeolites could be used and will know how to select appropriate adsorbents for the first and second PSA units.

When the PSA system that produces at least two product streams comprises a three-product PSA unit, the high-pressure hydrogen stream may be removed during a high pressure, co-current adsorption step in the PSA cycle, the second gas stream may be removed during a co-current depressurization step in the PSA cycle, and the low-pressure $CO_2$ stream may be removed during a counter-current depressurization step and a counter-current purge step in the PSA cycle.

In some embodiments, when the PSA system that produces at least two product streams is a three-product PSA unit, the PSA cycle may comprise:

a high pressure, co-current adsorption and hydrogen removal step;

at least one co-current depressurization step following the high pressure, co-current adsorption step and hydrogen removal step;

a co-current depressurization and second gas removal step following the at least one co-current depressurization step;

a counter-current blowdown step and $CO_2$ removal step following the intermediate pressure co-current depressurization and second gas removal step;

a counter-current purge and $CO_2$ removal step following the counter-current blowdown step;

at least one counter-current re-pressurization step following the counter-current purge and $CO_2$ removal step; and optionally a co-current feed re-pressurization step following the at least one counter-current re-pressurization step or a counter-current product re-pressurization following the at least one counter-current re-pressurization step.

In some embodiments, the $CO_2$ recovery system comprises a refrigerated $CO_2$ fractionation process wherein refrigeration cooling is provided by: at least two refrigeration circuits wherein one of the refrigeration circuits utilizes a portion of the liquid $CO_2$ product recovered from a distillation column; or a single closed loop multi-component mixed refrigerant circuit, as described more fully below.

In some embodiments, the process can include a catalytic oxidation (CATOX) reactor on the second stream to recover heat in the form of high-pressure steam from un-converted carbon monoxide and methane from the hydrogen production process and un-recovered hydrogen. Approximately the same amount of heat or steam is produced as when the second stream is sent to a furnace. However, sending it to the CATOX reactor unit avoids the $CO_2$ emissions that would be created from burning these components in a furnace and increases the percentage $CO_2$ captured from the process. The CATOX reactor unit can be approximately isothermal, with catalyst on one side of a heat exchanger and boiling water on the other side. For example, the CATOX reactor unit could have a water/steam (reactor) temperature of about 250° C. The scale of the reactor could be relatively small, e.g., a total gas feed rate (fuel gas+oxygen) of 6,000 $Nm^3/hr$ for a hydrogen production plant capacity of 100,000 $Nm^3/hr$.

In some embodiments, there is a selective bypass arrangement to allow the system to operate in the event there is a problem with the compressor, $CO_2$ recovery system, or PSA system that produces at least two product streams. In this case, the compressor, $CO_2$ recovery system, or PSA system that produces at least two product streams are bypassed, and the tail gas stream from the hydrogen PSA unit is sent to a furnace in the hydrogen production process unit or elsewhere. Suitable furnace burners include, but are not limited to, the burners described in U.S. Pat. No. 6,875,008 modified to include an inlet for the tail gas stream, and the burners described in U.S. Application Ser. No. 63/167,286, entitled Active And Passive Combustion Stabilization For Burners For Highly And Rapidly Varying Fuel Gas Compositions, filed on even date herewith, each of which is incorporated by reference in its entirety.

Additional energy recovery can be obtained from the effluent of a WGS unit in the process. The effluent stream from the WGS unit can be heat exchanged with a process stream to form a cooled effluent steam and a pre-heated process stream. Waste heat can be recovered from the cooled effluent stream to generate steam using a process involving a reaction of reversible oligomerization of phosphoric acid. The contact of waste heat with phosphoric acid leads to oligomerization to diphosphoric acid. As a result of the oligomerization, a water molecule splits off and condenses, causing cooling of the waste heat. The pressure is increased on the diphosphoric acid stream. Waste heat then evaporates the water which is absorbed by the diphosphoric acid. This causes de-oligomerization and hydrolysis to occur resulting in conversion back to phosphoric acid and the production of higher value process heat. The pressure is then decreased on the phosphoric acid stream, and the cycle is repeated. The process of waste heat recovery using the reversible oligomerization of phosphoric acid is available from Qpinch of Antwerp, Belgium.

Another aspect of the invention is an apparatus for producing a hydrogen-enriched product and recovering $CO_2$ from a hydrogen production process unit. In one embodiment, the apparatus comprises: a hydrogen production process unit having at least one inlet and at least one outlet; a hydrogen PSA unit having an inlet, a hydrogen outlet, and a tail gas outlet, the hydrogen PSA unit inlet in fluid communication with the hydrogen production process unit outlet; a compressor having an inlet and an outlet, the compressor inlet in fluid communication with the hydrogen PSA tail gas outlet; a $CO_2$ recovery system having an inlet, an first outlet, and an overhead outlet, the $CO_2$ recovery system inlet in fluid communication with the compressor outlet; and a PSA system having at least an inlet, a high pressure hydrogen outlet, and a low pressure $CO_2$ outlet, the PSA system inlet in fluid communication with the $CO_2$ recovery system overhead outlet, and the low pressure $CO_2$ outlet in fluid communication with the compressor inlet.

In some embodiments, the apparatus further comprises: a dryer and a chiller positioned between the compressor and the $CO_2$ recovery system; the dryer having an inlet and at least one outlet, the dryer inlet in fluid communication with the compressor outlet; the chiller having a gas inlet, a gas outlet, a chilling fluid inlet and a chilling fluid outlet, the chiller gas inlet in fluid communication with the dryer outlet, the chiller fluid inlet in fluid communication with a source of chilling fluid; and the inlet of the $CO_2$ recovery system in fluid communication with the chiller gas outlet.

In some embodiments, the PSA system further comprises a second gas outlet in fluid communication with a combustion unit in the hydrogen production process unit; or the second gas outlet of the PSA system is in fluid communication with an inlet of a catalytic oxidation unit, and an outlet of the catalytic oxidation unit is in fluid communication with the inlet of the compressor.

In some embodiments, the PSA system comprises a first PSA unit having an inlet and first and second outlets, and a second PSA unit having an inlet and first and second outlets; the inlet of the first PSA unit comprises the inlet of the PSA system; the first outlet of the first PSA unit comprises the low pressure $CO_2$ outlet; the inlet of the second PSA unit is in fluid communication with the second outlet of the first PSA unit; and the first outlet of the second PSA unit comprises the high pressure hydrogen outlet and the second outlet of the second PSA unit comprises the second gas outlet.

FIG. 1 illustrates one embodiment of a hydrogen production process 100 incorporating a PSA system that produces at least two product streams comprising a three-product PSA unit of the present invention. Natural gas 105 and water 110 are sent to the reaction section 112 of the steam reforming process unit 120, and assist fuel gas 114 and air 115 are sent to a furnace 118 for combustion with air in the steam reforming process unit 120. Other feed streams comprising hydrocarbons could be used instead of natural gas including, but not limited to, naphtha and liquefied petroleum gas (LPG). The assist fuel gas is an extra fuel source to provide stability and enough heat for the reforming reaction because the PSA tail gas or vent gas does not provide enough heat to drive the process. Suitable assist fuel gases include, but are not limited to, natural gas, and other largely hydrocarbon containing fuels, such as refinery fuel gas, petrochemical complex synthesized fuel gas, vaporized naphtha or vaporized liquefied petroleum gas (LPG), or blends of hydrocarbon containing fuels with hydrogen, up to and including crude or purified hydrogen.

The steam reforming and water-gas shift reactions produce an effluent stream 125 comprising hydrogen, $CO_2$, water and at least one of methane, carbon monoxide, and nitrogen. Flue gas stream 130 and steam stream 135 also exit the steam reforming process unit 120.

Effluent stream 125 has a temperature of or about 30° C. to about 50° C. (after heat recovery and cooling in the steam reforming process), and a pressure of about 2,000 to about 3,000 kPa. Effluent stream 125 is sent to the hydrogen PSA unit 140 where it is separated into a high purity hydrogen stream 145 enriched in hydrogen and a hydrogen depleted tail gas stream 150 comprising a portion of the hydrogen, the $CO_2$, the water, and the at least one of the methane, carbon monoxide, and nitrogen.

The tail gas stream 150 is sent to compressor 155 where it is compressed from a pressure in the range of about 110 kPa to about 200 kPa to a pressure in the range of about 3,000 kPa to about 6,000 kPa.

Compressed tail gas stream 160 is sent to a $CO_2$ recovery unit 165 where it is dried to remove water stream 167, cooled to a temperature of about −20° C. to about −50° C., and separated into a bottoms stream 170 and an overhead stream 175. The bottoms stream 170 comprising liquid $CO_2$ is recovered.

The overhead stream 175 is sent to the PSA system that produces at least two product streams 180 comprising a three-product PSA unit 185 where it is separated into three streams. A high-pressure hydrogen stream 190 is recovered. A low-pressure $CO_2$ stream 195 is recycled to the compressor 155. Intermediate pressure vent gas stream 200 comprising the at least one of the methane, carbon monoxide, and nitrogen and a small amount of hydrogen (e.g., less than about 20%, or about 10% to about 20%) is sent to the steam reforming process unit 120 as fuel.

Bypass line 202 sends the tail gas stream 150 to the furnace 118 in the steam reforming process unit 120 for combustion. This allows the steam reforming process unit 120 to continue operating without recovery of $CO_2$ in the event of a problem with the compressor 155, the $CO_2$ recovery unit 165, or the PSA system that produces at least two product streams 180.

Figure 2:
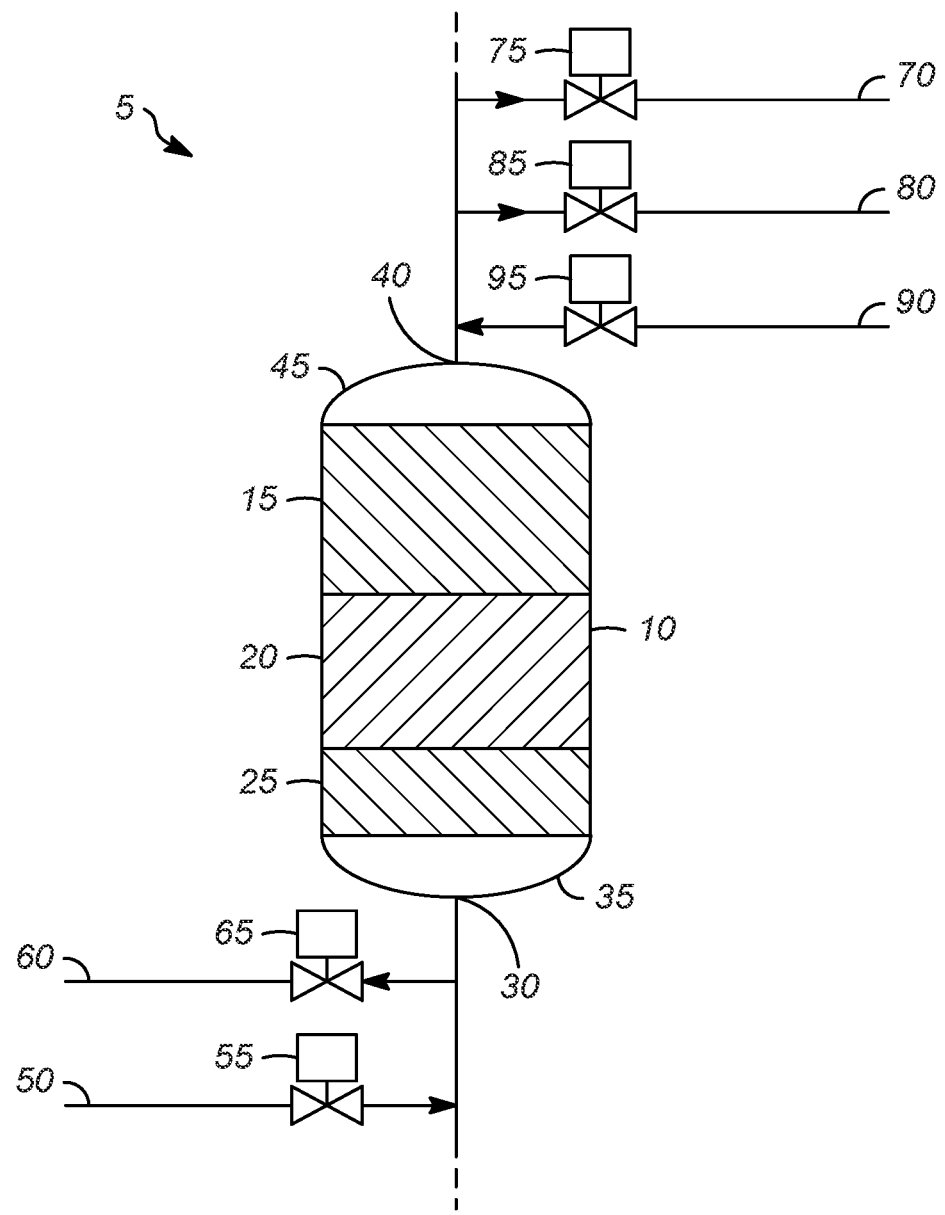
FIG. 2 is an illustration of one embodiment of a three-product PSA unit for use in the PSA system that produces at least two product streams of the present invention.

FIG. 2 illustrates a PSA unit 5 comprising a PSA adsorption vessel 10. The PSA adsorption vessel 10 includes three adsorption layers 15, 20, 25. The PSA adsorption vessel 10 includes a first opening 30 at a first end 35 and a second opening 40 at a second end 45. The first opening 30 is in selective fluid communication with high pressure feed gas inlet line 50 via valve 55 and with low pressure tail gas outlet line 60 via valve 65. The second opening 40 is in selective fluid communication with high pressure product outlet line 70 via valve 75, intermediate pressure vent gas outlet line 80 via valve 85, and low pressure purge gas inlet line 90 via valve 95.

During the high pressure, co-current adsorption and product removal step of the PSA cycle, valves 55 and 75 are open and valves 65, 85, and 95 are closed, allowing the high pressure feed gas to enter the PSA adsorption vessel 10 and the high pressure hydrogen stream to exit.

During the at least one co-current depressurization step, valves 55, 65, 75, 85, and 95 are closed.

During the intermediate pressure co-current depressurization and vent removal step, valve 85 is open, and valves 55, 65, 75, and 95 are closed.

During the counter-current blowdown step and tail gas removal step, valve 65 is open, and valves 55, 75, 85, and 95 are closed. The bed de-pressurizes through valve 65, and some of the $CO_2$ is desorbed.

During the counter-current purge and tail gas removal step, valves 65 and 95 are open, and valves 55, 75, and 85 are closed. The purge gas is introduced, and the $CO_2$ is removed.

During the at least one counter-current re-pressurization step, valves 55, 65, 75, 85, and 95 are closed.

Figure 3:
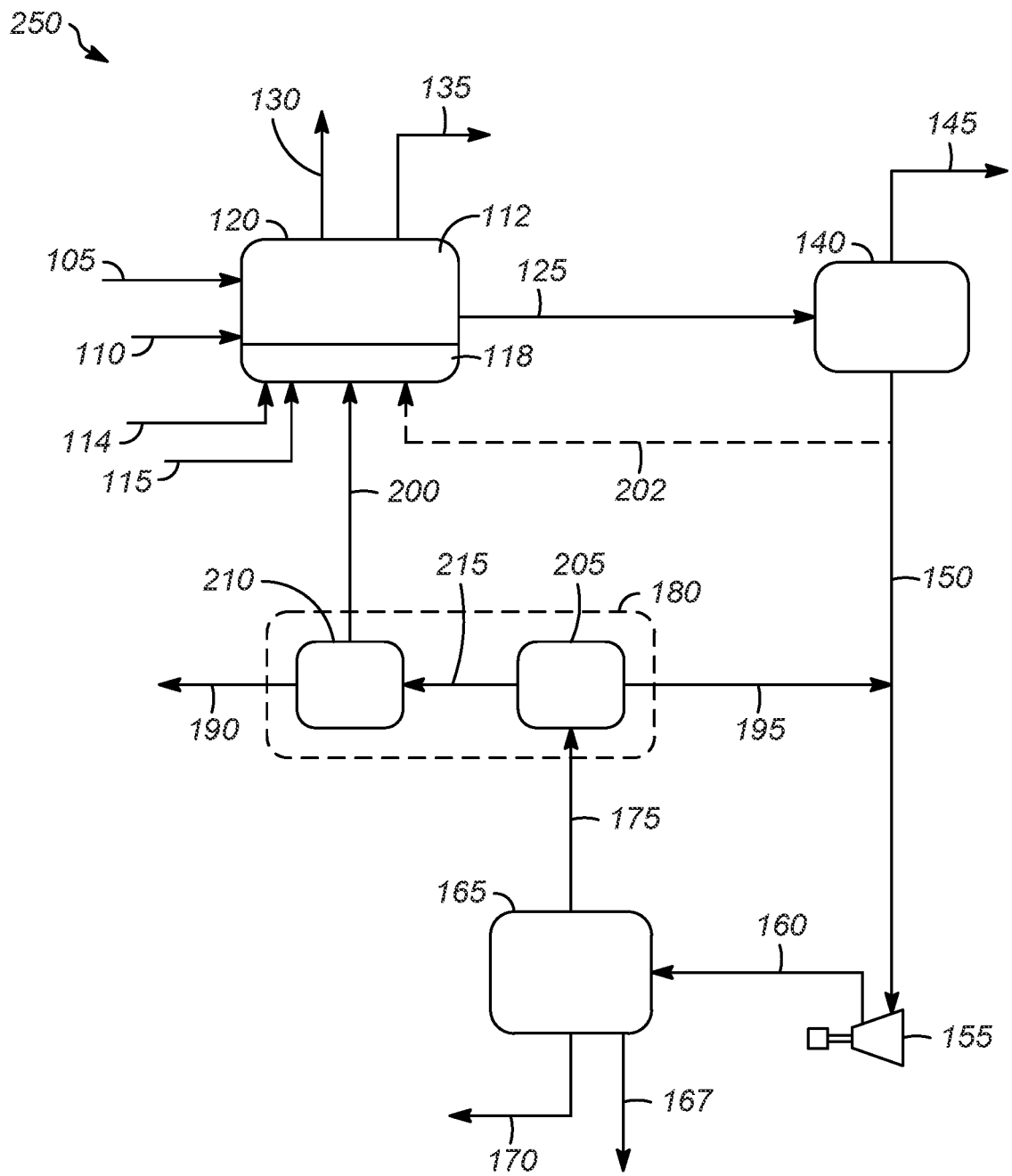
FIG. 3 is an illustration of another embodiment of a method of producing hydrogen and recovering $CO_2$ from a steam reforming process unit using another embodiment of a PSA system that produces at least two product streams of the present invention.

FIG. 3 illustrates another embodiment of a hydrogen production process 250 of the present invention. Natural gas 105 and water 110 are sent to the reaction section 112 of the steam reforming process unit 120, and assist fuel gas 114 and air 115 are sent to a furnace 118 in the steam reforming process unit 120.

The reforming reaction produces an effluent stream 125 comprising hydrogen, $CO_2$, water, and at least one of methane, carbon monoxide, and nitrogen. Flue gas stream 130 and steam stream 135 also exit the steam reforming process unit 120.

Effluent stream 125 is sent to hydrogen PSA unit 140 where it is separated into a high purity hydrogen stream 145 enriched in hydrogen and a hydrogen depleted tail gas stream 150 comprising a portion of the hydrogen, the $CO_2$, the water, and the at least one of the methane, carbon monoxide, and nitrogen.

The tail gas stream 150 is sent to compressor 155. Compressed tail gas stream 160 is sent to the $CO_2$ recovery system 165 for separation into a bottoms stream 170 and an overhead stream 175. The bottoms stream 170 comprising liquid $CO_2$ is recovered.

The overhead stream 175 is sent to the PSA system that produces at least two product streams 180 comprising two PSA units 205, 210 in series. The overhead stream 175 is separated into the low-pressure $CO_2$ stream 195 and a high pressure stream 215 which comprises the hydrogen and at least one of the methane, carbon monoxide, and nitrogen. The low-pressure $CO_2$ stream 195 is recycled to the compressor 155.

The high-pressure stream 215 is sent to the second PSA unit 210 where it is separated into the high pressure hydrogen stream 190 and low pressure tail gas stream 200. The high-pressure hydrogen stream 190 is recovered. The low-pressure tail gas stream 200 comprising at least one of the methane, carbon monoxide, and nitrogen is sent to the steam reforming process unit 120 as fuel.

Bypass line 202 sends the tail gas stream 150 to the furnace 118 in the steam reforming process unit 120 for combustion.

Figure 4:
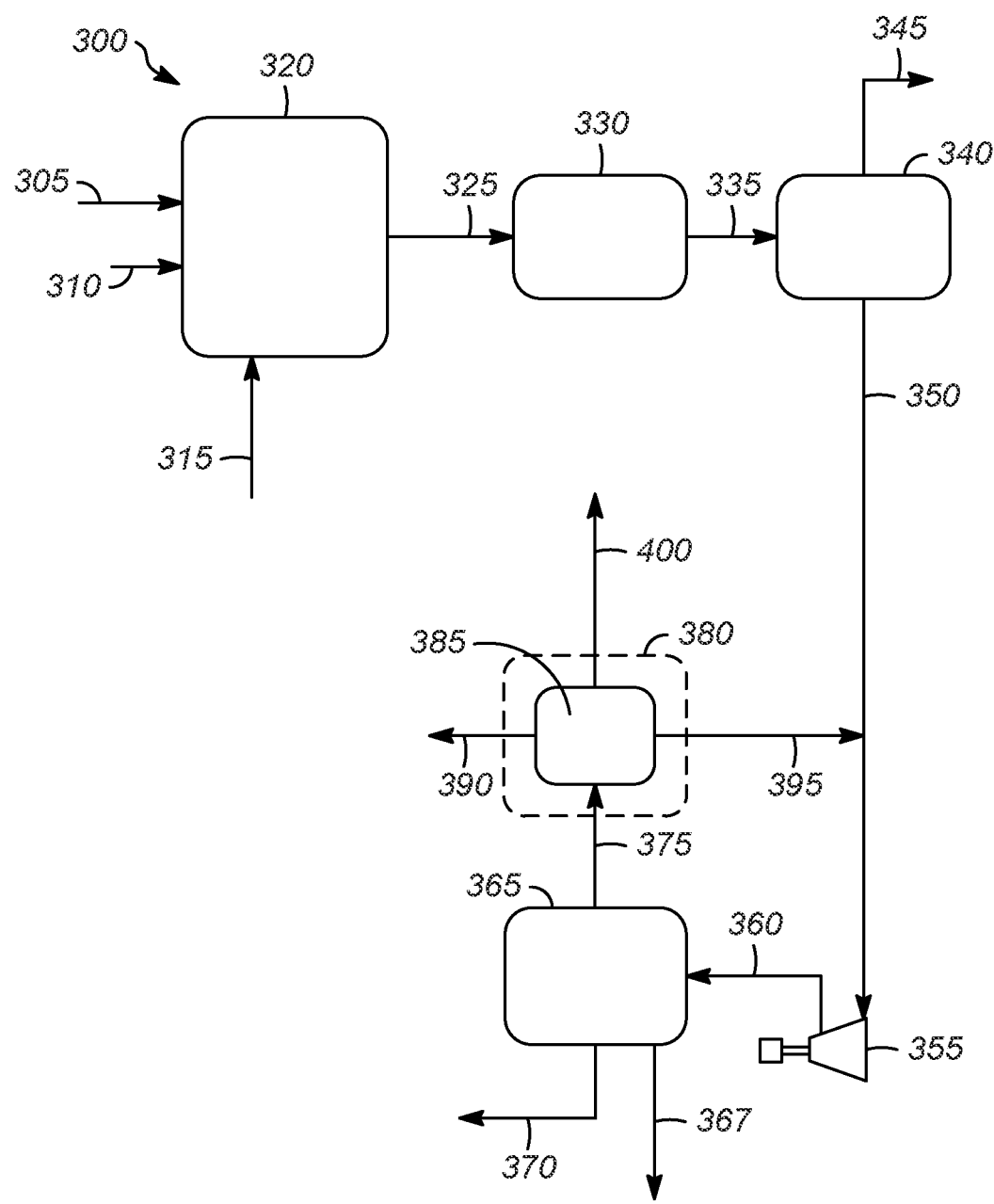
FIG. 4 is an illustration of another embodiment of a method of producing hydrogen and recovering $CO_2$ from an ATR process unit using the PSA system that produces at least two product streams of the present invention.

FIG. 4 illustrates another embodiment of a hydrogen production process 300 incorporating a three-product PSA unit of the present invention. Natural gas 305, steam 310, and oxygen stream 315 are sent to the ATR/GHR reaction unit 320. Other feed streams comprising hydrocarbons that could be used instead of natural gas for ATR/GHR, steam reforming, and PDX processes include, but are not limited to, naphtha and liquefied petroleum gas (LPG). The PDX and gasification processes could use solid feedstock including, but not limited to, coal and petroleum coke.

The reforming reaction produces an effluent stream 325 which is sent to the water gas shift reaction unit 330. The effluent 335 from the water gas shift reaction unit 330 comprises hydrogen, $CO_2$, and at least one of methane, carbon monoxide, argon, and nitrogen.

Effluent 335 is sent to PSA unit 340 where it is separated into a high purity hydrogen stream 345 enriched in hydrogen and a hydrogen depleted tail gas stream 350 comprising a portion of the hydrogen, the $CO_2$, and the methane, carbon monoxide, nitrogen, and argon.

The tail gas stream 350 is sent to compressor 355. Compressed tail gas stream 360 is sent to the $CO_2$ recovery system 365 for separation into a bottoms stream 370 and an overhead stream 375. The bottoms stream 370 comprising liquid $CO_2$ is recovered.

The overhead stream 375 is sent to the PSA system that produces at least two product streams 380 comprising a three product PSA unit 385 where it is separated into three streams. A high-pressure hydrogen stream 390 is recovered. A low-pressure $CO_2$ stream 395 is recycled to the compressor 355. Intermediate pressure vent gas stream 400 comprising the methane, carbon monoxide, nitrogen, and argon is sent to a combustion unit to generate the heat required for part of the steam stream 310. This combustion unit could entail a fired heater or a waste heat boiler, or the gas stream could be used as fuel gas elsewhere in the facility.

Figure 5:
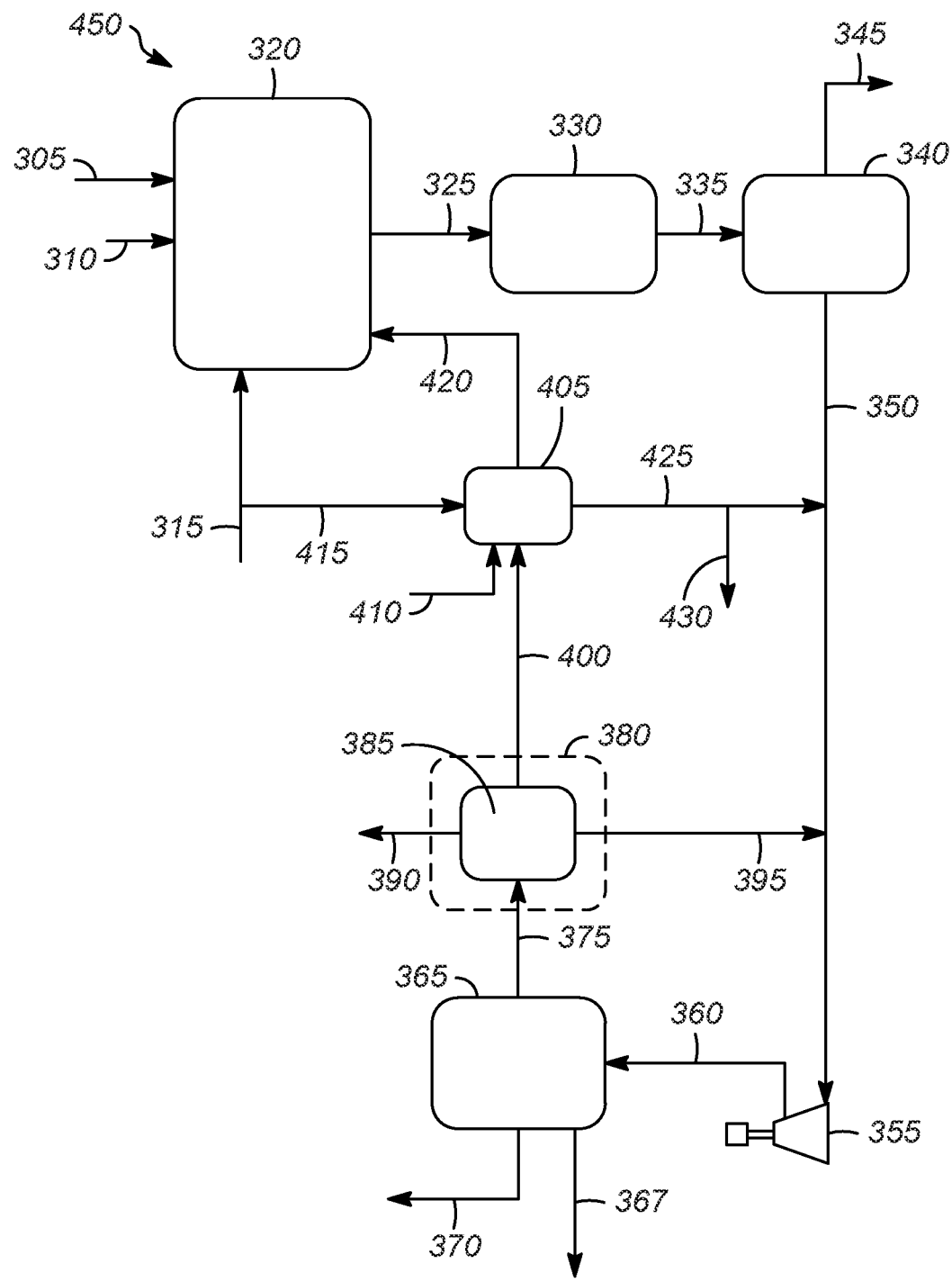
FIG. 5 is an illustration of another embodiment of a method of producing hydrogen and recovering $CO_2$ from an ATR process unit using the PSA system that produces at least two product streams of the present invention.

FIG. 5 illustrates another embodiment of a hydrogen production process 450 of the present invention. Natural gas 305, steam 310, and oxygen stream 315 are sent to the ATR/GHR reaction unit 320. The reforming reaction produces an effluent stream 325 which is sent to the water gas shift reaction unit 330. The effluent 335 from the water gas shift reaction unit 330 comprises hydrogen, $CO_2$, and at least one of methane, carbon monoxide, argon, and nitrogen.

Effluent 335 is sent to PSA unit 340 where it is separated into a high purity hydrogen stream 345 enriched in hydrogen and a hydrogen depleted tail gas stream 350 comprising a portion of the hydrogen, the $CO_2$, and the methane, carbon monoxide, nitrogen, and argon.

The tail gas stream 350 is sent to compressor 355. Compressed tail gas stream 360 is sent to the $CO_2$ recovery system 365 for separation into a bottoms stream 370 and an overhead stream 375. The bottoms stream 370 comprising liquid $CO_2$ is recovered.

The overhead stream 375 is sent to the PSA system that produces at least two product streams 380 comprising a three product PSA unit 385 where it is separated into three streams. A high-pressure hydrogen stream 390 is recovered. A low-pressure $CO_2$ stream 395 is recycled to the compressor 355.

Intermediate pressure vent gas stream 400 comprising the methane, carbon monoxide, nitrogen, and argon is sent to the catalytic oxidation reaction unit 405, along with a portion 415 of the oxygen stream 315. The catalytic oxidation reaction of the methane and carbon monoxide and hydrogen forms $CO_2$ recycle stream 425. Water stream 410 is used for cooling the catalytic oxidation reaction unit 405 and produces steam stream 420. Steam stream 420 is sent to the ATR/GHR reaction unit 320. $CO_2$ recycle stream 425 is recycled to the compressor 355. A bleed stream 430 is removed from $CO_2$ recycle stream 425 to prevent the buildup of impurities in the process. Water formed in catalytic oxidation reaction unit 405 is removed in stream 367 in a downstream drier in $CO_2$ recovery system 365.

Figure 6:
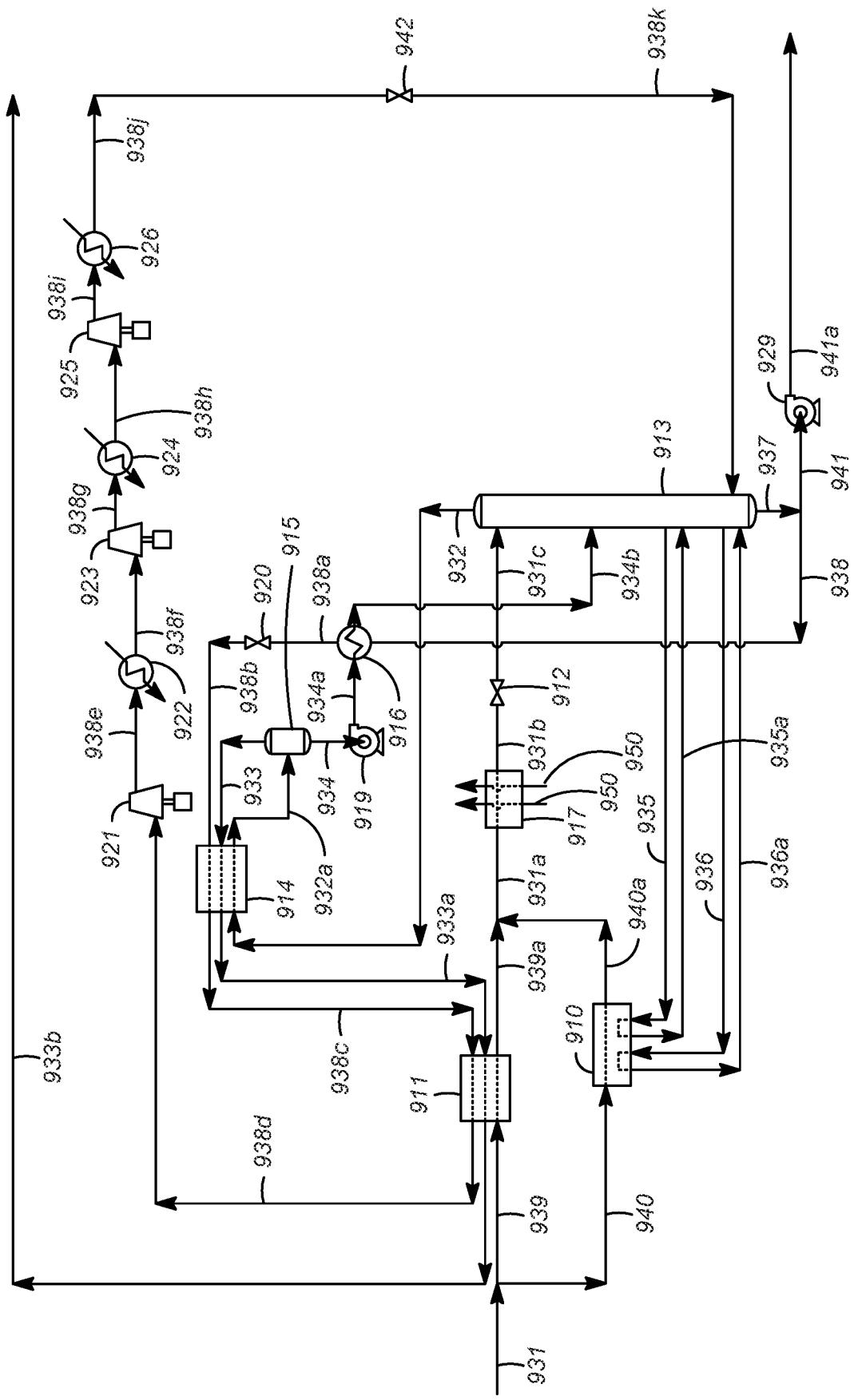
FIG. 6 is an illustration of one embodiment of a $CO_2$ recovery system using a dual refrigerant $CO_2$ fractionation process.

FIG. 6 is a process flow diagram showing the design of a $CO_2$ recovery system to remove carbon dioxide from hydrogen and lighter components from a synthetic gas stream. The process involves the use of a dual refrigerant $CO_2$ fractionation process.

In this process, inlet gas enters the plant as feed stream 931. The feed stream 931 is usually dehydrated to prevent hydrate (ice) formation under cryogenic conditions. Solid and liquid desiccants have both been used for this purpose.

The feed stream 931 is split into two streams (stream 939 and 940). Stream 939 is cooled in heat exchanger 911 by heat exchange with cool carbon dioxide vapor (stream 938c) and cold residue gas stream 933a. Stream 940 is cooled in heat exchanger 910 by heat exchange with column reboiler liquids (stream 936) and column side reboiler liquids (stream 935).The cooled streams from heat exchangers 910 and 911 are recombined into stream 931a. Stream 931a is further cooled with commercial refrigerant 950 (propane or R-134A, for example) and the resultant stream (cooled stream 931b) is expanded to the operating pressure of fractionation tower 913 by expansion valve 912, cooling stream 931c before it is supplied to fractionation tower 913 at its top column feed point.

Overhead vapor stream 932 leaves fractionation tower 913 and is cooled and partially condensed in heat exchanger 914. The partially condensed stream 932a enters separator 915 where the vapor (cold residue gas stream 933) is separated from the condensed liquid stream 934. Condensed liquid stream 934 is pumped to slightly above the operating pressure of fractionation tower 913 by pump 919 before liquid stream 934a enters heat exchanger 916 and is heated and partially vaporized by heat exchange with carbon dioxide refrigerant from the bottom of the distillation column (described below). The partially vaporized stream 934b is thereafter supplied as feed to fractionation tower 913 at a mid-column feed point. A cold compressor (not shown) can be applied to overhead vapor stream 932 if higher pressure and/or lower carbon dioxide content is desired in the feed to the PSA system. If a compressor is used on this stream, then the pump 919 can be eliminated, and the liquid from separator 915 would then be sent to fractionation tower 913 via a liquid level control valve.

Fractionation tower 913 is a conventional distillation column containing a plurality of vertically spaced trays, one or more packed beds, or some combination of trays and packing. It also includes reboilers (such as the reboiler and the side reboiler described previously) which heat and vaporize a portion of the liquids flowing down the column to provide the stripping vapors which flow up the column to strip the column bottom liquid product stream 937 of hydrogen and lighter components. The trays and/or packing provide the necessary contact between the stripping vapors rising upward and cold liquid falling downward, so that the column bottom liquid product stream 937 exits the bottom of the tower, based on reducing the hydrogen and lighter component concentration in the bottom product to make a very pure carbon dioxide product.

Column bottom liquid product stream 937 is predominantly liquid carbon dioxide. A small portion (stream 938) is subcooled in heat exchanger 916 by liquid stream 934a from separator 915 as described previously. The subcooled liquid (stream 938a) is expanded to lower pressure by expansion valve 920 and partially vaporized, further cooling stream 938b before it enters heat exchanger 914. Stream 938b functions as refrigerant in heat exchanger 914 to provide cooling of partially condensed stream 932a as described previously, with the resulting carbon dioxide vapor leaving as stream 938c.

The cool carbon dioxide vapor from heat exchanger 914 (stream 938c) is heated in heat exchanger 911 by heat exchange with the feed gas as described previously. The warm carbon dioxide vapor (stream 938d) is then compressed to a pressure above the pressure of fractionation tower 913 in three stages by compressors 921, 923, and 925, with cooling after each stage of compression by discharge coolers 922, 924, and 926. The compressed carbon dioxide stream (stream 938j) is then flash expanded through valve 942 and returned to a bottom feed location in fractionation tower 913. The recycled carbon dioxide (stream 938k) provides further heat duty and stripping gas in fractionation tower 913. The remaining portion (stream 941) of column bottom liquid product stream 937 is pumped to high pressure by pump 929 so that stream 941a forms a high pressure carbon dioxide stream which then flows to pipeline or reinjection. In certain instances, the carbon dioxide stream needs to be delivered as a sub-cooled liquid at lower pressure that can be transported in insulated shipping containers. For these cases, the carbon dioxide product (stream 941) is sub-cooled in heat exchanger 917 with refrigerant 950 before being let down to storage tank conditions. Therefore pump 929 is eliminated.

The cold residue gas stream 933 leaves separator 915 and provides additional cooling in heat exchanger 914. The warmed residue gas stream 933a is further heated after heat exchange with the feed gas in heat exchanger 911 as described previously. The warm residue gas stream 933b is then sent to the PSA system for further treating.

Figure 7:
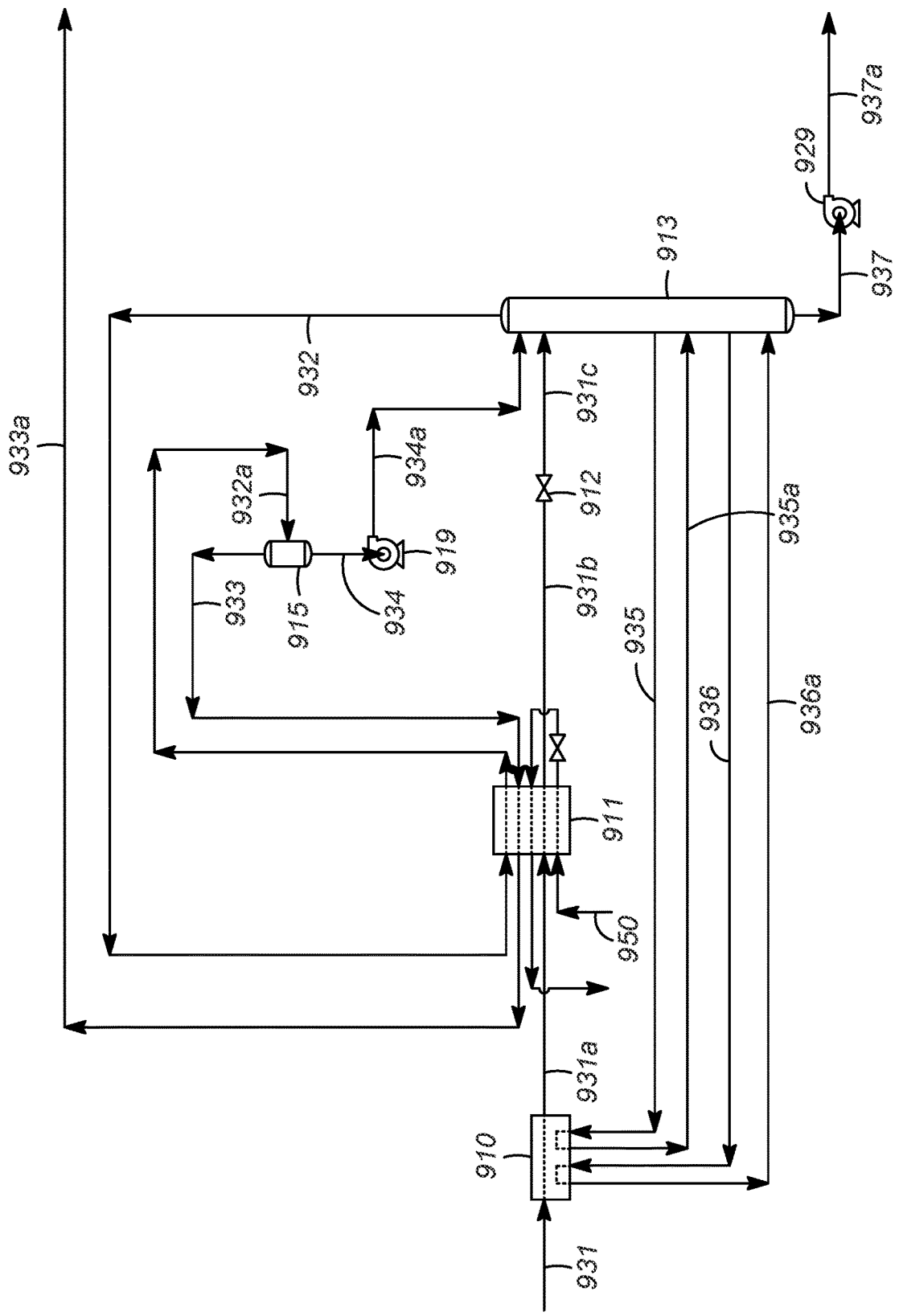
FIG. 7 is an illustration of another embodiment of a $CO_2$ recovery system using a mixed refrigerant $CO_2$ fractionation process.

FIG. 7 is a process flow diagram showing the design of a processing unit to remove carbon dioxide from hydrogen and lighter components from a synthetic gas stream. In this process, inlet gas enters the plant as feed stream 931. The process involves the use of a mixed refrigerant $CO_2$ fractionation process.

The feed stream 931 is usually dehydrated to prevent hydrate (ice) formation under cryogenic conditions. Solid and liquid desiccants have both been used for this purpose.

The feed stream 931 is cooled in heat exchanger 910 by heat exchange with column reboiler liquids (stream 936) and column side reboiler liquids (stream 935). Stream 931a is further cooled in heat exchanger 911 by heat exchange with cold residue gas stream 933, and a flash expanded multi-component mixed refrigerant stream comprised of both hydrocarbon and non-hydrocarbon components. The component mixture in the mixed refrigerant stream is designed to provide the most efficient cooling curve in heat exchanger 911 based on the inlet gas feed conditions. The further cooled stream 931b is expanded to the operating pressure of fractionation tower 913 by expansion valve 912, and sent to fractionation tower 913 at a mid-column feed point.

Overhead vapor stream 932 leaves fractionation tower 913 and is cooled and partially condensed in heat exchanger 911 with the mixed refrigerant stream. The partially condensed stream 932a enters separator 915 where the vapor (cold residue gas stream 933) is separated from the condensed liquid stream 934. Condensed liquid stream 934 is pumped to slightly above the operating pressure of fractionation tower 913 by pump 919 before liquid stream 934a is sent to fractionation tower 913 at the top feed point. A cold compressor (not shown) can be applied to overhead vapor stream 932 if higher pressure and/or lower carbon dioxide content is desired in the feed to the PSA system. If a compressor is used on this stream, then the pump 919 can be eliminated, and the liquid from separator 915 would then be sent to fractionation tower 913 via a liquid level control valve.

Fractionation tower 913 is a conventional distillation column containing a plurality of vertically spaced trays, one or more packed beds, or some combination of trays and packing. It also includes reboilers (such as the reboiler and the side reboiler described previously) which heat and vaporize a portion of the liquids flowing down the column to provide the stripping vapors which flow up the column to strip the column bottom liquid product stream 937 of hydrogen and lighter components. The trays and/or packing provide the necessary contact between the stripping vapors rising upward and cold liquid falling downward, so that the column bottom liquid product stream 937 exits the bottom of the tower, based on reducing the hydrogen and lighter component concentration in the bottom product to make a very pure carbon dioxide product.

Column bottom liquid product stream 937 is predominantly liquid carbon dioxide. Column bottom liquid product stream 937 is pumped to high pressure by pump 929 so that stream 937a forms a high pressure carbon dioxide stream which then flows to pipeline or reinjection. In certain instances, the carbon dioxide stream needs to be delivered as a sub-cooled liquid at lower pressure that can be transported in insulated shipping containers. For these cases, the carbon dioxide product in column bottom liquid product stream 937 is sub-cooled in heat exchanger 911 with mixed refrigerant 950 before being let down to storage tank conditions. Therefore pump 929 is eliminated.

The warm-residue gas stream 933a leaves heat exchanger 911 after heat exchange with the feed gas as described previously. The warm residue gas stream 933a is then sent to the PSA system for further treating.

EXAMPLES

The following examples are intended to further illustrate the integrated process. They are not meant to limit the claims of the invention to the particular details of the examples.

Example 1

PSA System Comprising Two PSA Units

Tables 1-10 provide computer simulation results for a PSA system that produces at least two product streams comprising two PSA units in series.

Table 1 shows a 6-bed cycle with 3 pressure equalization steps for the first PSA unit. It is an abbreviated form of the overall PSA cycle (called a sub-cycle) and is routinely used by practitioners to capture the minimum amount of required information to represent the complete multi-bed PSA cycle. These sub-cycles are replicated according to known procedures (with each row corresponding to one bed) in order produce complete cycle charts. It is understood that other variations of cycle details are possible. Table 2 provides a detailed description of the 6-bed sub-cycle in Table 1.

These cycles were used in the computer simulation to provide the results for the first two-product PSA unit 205 (FIG. 3) shown in Tables 3-5.

TABLE 1

| ADS | |
|---|---|
| EQ1D | EQ2D |
| EQ3D | PP |
| BD | PURGE |
| EQ3U | EQ2U |
| EQ1U | FREP |

TABLE 2

| Step | Abbreviation | Flow Direction | Time * | Starting Pressure, kPa | Ending Pressure, kPa |
|---|---|---|---|---|---|
| Adsorption | ADS | Up | x | 4400 | 4400 |
| Equalization 1 | EQ1D | Up | 0.3x | 4400 | 2930 |
| Equalization 2 | EQ2D | Up | 0.7x | 2930 | 1740 |
| Equalization 3 | EQ3D | Up | 0.3x | 1740 | 990 |
| Provide Purge | PP | Up | 0.7x | 990 | 320 |
| Blowdown | BD | Down | 0.3x | 320 | 170 |
| Purge | PURGE | Down | 0.7x | 170 | 170 |
| Equalization 3 | EQ3U | Down | 0.3x | 170 | 750 |
| Equalization 2 | EQ2U | Down | 0.7x | 750 | 1740 |
| Equalization 1 | EQ1U | Down | 0.3x | 1740 | 2930 |
| Feed Repressurization | FREP | Up | 0.7x | 2930 | 4400 |

* x = sub-cycle time (ranges from 50 to 150 sec)

A computer simulation was run for the first PSA unit using the cycle shown in Tables 1-2. The feed gas composition is shown in Table 3 and the bed loading is given in Table 4. As can be seen in Table 5, the low-pressure $CO_2$ stream contains 99.6% of the $CO_2$ and only 6.7% of the hydrogen in the overhead stream. The low-pressure $CO_2$ stream also includes about 25% of the CO, over 30% of the $CH_4$, and about 15% of the nitrogen. The third gas stream contains over 93% of the hydrogen in the overhead stream and 0.4% of the $CO_2$, along with about 75% of the CO, over 65% of the $CH_4$, and about 85% of the nitrogen.

TABLE 3

| | Feed Gas, Mol % |
|---|---|
| Hydrogen | 42 |
| Carbon Monoxide | 15 |
| Methane | 24 |
| Carbon Dioxide | 18 |
| Nitrogen | 1 |

Pressure: 4400 kPa
Temperature: 40° C.

TABLE 4

| | Bed Loading, Vol % |
|---|---|
| NaY Zeolite | 20 |
| Silica Gel (bottom) | 80 |

TABLE 5

| | % Recovery from Feed | | |
|---|---|---|---|
| | Product | Tail Gas | Total |
| Hydrogen | 93.3 | 6.7 | 100.0 |
| Carbon Monoxide | 75.7 | 24.3 | 100.0 |
| Methane | 67.7 | 32.3 | 100.0 |
| Carbon Dioxide | 0.4 | 99.6 | 100.0 |
| Nitrogen | 84.8 | 15.2 | 100.0 |

Table 6 shows an 8-bed cycle with 5 pressure equalization steps for the second PSA unit, and Table 7 provides a detailed description of the 8-bed PSA cycle in Table 6.

These cycles were used in the a computer simulation to provide the results for the second two-product PSA unit 210 (FIG. 3) shown Tables 8-10.

TABLE 6

| ADS | |
|---|---|
| EQ1D | EQ2D |
| EQ3D | EQ4D |
| EQ5D | BD |
| PURGE | |
| EQ5U | EQ4U |
| EQ3U | EQ2U |
| EQ1U | PREP |

TABLE 7

| Step | Abbreviation | Flow Direction | Time * | Starting Pressure, kPa | Ending Pressure, kPa |
|---|---|---|---|---|---|
| Adsorption | ADS | Up | x | 4200 | 4200 |
| Equalization 1 | EQ1D | Up | 0.5x | 4200 | 3100 |
| Equalization 2 | EQ2D | Up | 0.5x | 3100 | 2250 |
| Equalization 3 | EQ3D | Up | 0.5x | 2250 | 1400 |
| Equalization 4 | EQ4D | Up | 0.5x | 1400 | 870 |
| Equalization 5 | EQ5D | Up | 0.5x | 870 | 590 |
| Blowdown | BD | Down | 0.5x | 590 | 150 |
| Product Purge | PURGE | Down | x | 150 | 150 |
| Equalization 5 | EQ5U | Down | 0.5x | 150 | 330 |
| Equalization 4 | EQ4U | Down | 0.5x | 330 | 870 |
| Equalization 3 | EQ3U | Down | 0.5x | 870 | 1400 |
| Equalization 2 | EQ2U | Down | 0.5x | 1400 | 2250 |
| Equalization 1 | EQ1U | Down | 0.5x | 2250 | 3100 |
| Product Repressurization | PREP | Down | 0.5x | 3100 | 4200 |

* x = sub-cycle time (ranges from 30 to 150 sec)

A computer simulation was run for the second PSA unit using the cycle shown in Tables 6-7. The feed gas composition is shown in Table 8 and the bed loading is given in Table 9. As shown in Table 10, the high-pressure hydrogen stream contains 90% of the hydrogen in the feed stream to the second PSA unit, 3% of the nitrogen, and none of the CO, $CO_2$ or $CH_4$. The low-pressure second gas stream (tail gas stream) contains the remaining 10% of the hydrogen in the feed stream to the second PSA unit, 97% of the nitrogen, and all the $CO_2$, CO, and $CH_4$.

TABLE 8

|  | Feed Gas Mol % |
|---|---|
| Hydrogen | 58.6 |
| Carbon Monoxide | 16.1 |
| Methane | 24.0 |
| Carbon Dioxide | 0.1 |
| Nitrogen | 1.2 |

Pressure: 4200 kPa
Temperature: 40° C.

TABLE 9

|  | Bed Loading, Vol % |
|---|---|
| NaX Zeolite | 80 |
| Activated Carbon (bottom) | 20 |

TABLE 10

|  | % Recovery from Feed | | |
|---|---|---|---|
|  | Product | Tail Gas | Total |
| Hydrogen | 90.0 | 10.0 | 100.0 |
| Carbon Monoxide | 0.0 | 100.0 | 100.0 |
| Methane | 0.0 | 100.0 | 100.0 |
| Carbon Dioxide | 0.0 | 100.0 | 100.0 |
| Nitrogen | 3.0 | 97.0 | 100.0 |

Example 2

PSA System Comprising a Three Product PSA Unit

Tables 11-15 provide the experimental results for a PSA system comprising a three-product PSA unit.

Table 11 shows a 10-bed cycle with 3 pressure equalization steps. Table 12 provides a detailed description of the 10-bed PSA cycle in Table 11.

These cycles were used in an experimental pilot plant test of the three-product PSA unit 185 (FIG. 1) shown Tables 13-15.

TABLE 11

| ADS | |
| EQ1D | EQ2D |
| EQ3D | PP |
| PP | VENT |
| VENT | |
| BD | PURGE |
| PURGE | |
| EQ3U | EQ2U |
| EQ1U | FREP |
| FREP | |

TABLE 12

| Step | Abbreviation | Flow Direction | Time * | Starting Pressure, kPa | Ending Pressure, kPa |
|---|---|---|---|---|---|
| Adsorption | ADS | Up | x | 4400 | 4400 |
| Equalization 1 | EQ1D | Up | 0.5x | 4400 | 2850 |
| Equalization 2 | EQ2D | Up | 0.5x | 2850 | 1600 |
| Equalization 3 | EQ3D | Up | 0.5x | 1600 | 1070 |
| Provide Purge | PP | Up | x | 1070 | 820 |

TABLE 12-continued

| Step | Abbreviation | Flow Direction | Time * | Starting Pressure, kPa | Ending Pressure, kPa |
|---|---|---|---|---|---|
| Vent | VENT | Up | 1.5x | 820 | 275 |
| Blowdown | BD | Down | 0.5x | 275 | 150 |
| Purge | PURGE | Down | 1.5x | 150 | 150 |
| Equalization 3 | EQ3U | Down | 0.5x | 150 | 550 |
| Equalization 2 | EQ2U | Down | 0.5x | 550 | 1600 |
| Equalization 1 | EQ1U | Down | 0.5x | 1600 | 2850 |
| Feed Repressurization | FREP | Up | 1.5x | 2850 | 4400 |

* x = sub-cycle time (ranges from 30 to 120 sec)

The feed gas composition is shown in Table 13, and the bed loading is given in Table 14. As shown in Table 15, the high pressure hydrogen stream contains 82.5% of the hydrogen in the incoming overhead stream, and none of the $CO_2$, CO, $CH_4$, or nitrogen. The low-pressure $CO_2$ stream contains all of the $CO_2$, 8.8% of the hydrogen, 30.8% of the CO, 49.8% of the $CH_4$, and 11.4% of the nitrogen. The intermediate-pressure vent gas stream contains 8.7% of the hydrogen, 69.2% of the CO, 50.2% of the $CH_4$, 88.6% of the nitrogen, and no $CO_2$.

TABLE 13

|  | Feed Gas, Mol % |
|---|---|
| Hydrogen | 40 |
| Carbon Monoxide | 14 |
| Methane | 22 |
| Carbon Dioxide | 22 |
| Nitrogen | 2 |

Pressure: 4400 kPa
Temperature: 40° C.

TABLE 14

|  | Bed Loading, Vol % |
|---|---|
| 5A Zeolite (top) | 40 |
| NaY Zeolite | 20 |
| Activated Carbon | 20 |
| Silica Gel (bottom) | 20 |

TABLE 15

|  | % Recovery from Feed | | | |
|---|---|---|---|---|
|  | Product | Tail Gas | Vent | Total |
| Hydrogen | 82.5 | 8.8 | 8.7 | 100.0 |
| Carbon Monoxide | 0.0 | 30.8 | 69.2 | 100.0 |
| Methane | 0.0 | 49.8 | 50.2 | 100.0 |
| Carbon Dioxide | 0.0 | 100.0 | 0.0 | 100.0 |
| Nitrogen | 0.0 | 11.4 | 88.6 | 100.0 |

As used herein, the term "stream" can include various hydrocarbon molecules and other substances.

As used herein, the term "stream", "feed", "product", "part" or "portion" can include various hydrocarbon molecules, such as straight-chain and branched alkanes, naphthenes, alkenes, alkadienes, and alkynes, and optionally other substances, such as gases, e.g., hydrogen, or impurities, such as heavy metals, and sulfur and nitrogen compounds. Each of the above may also include aromatic and non-aromatic hydrocarbons.

As used herein, the term "overhead stream" can mean a stream withdrawn at or near a top of a vessel, such as a column.

As used herein, the term "bottoms stream" can mean a stream withdrawn at or near a bottom of a vessel, such as a column.

As used herein, the term "unit" can refer to an area including one or more equipment items and/or one or more sub-zones. Equipment items can include, but are not limited to, one or more reactors or reactor vessels, separation vessels, distillation towers, heaters, exchangers, pipes, pumps, compressors, and controllers. Additionally, an equipment item, such as a reactor, dryer, or vessel, can further include one or more zones or sub-zones.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top or overhead pressure is the pressure of the overhead vapor at the vapor outlet of the column. The bottom temperature is the liquid bottom outlet temperature. Net overhead lines and net bottoms lines refer to the net lines from the column downstream of any reflux or reboil to the column unless otherwise shown. Stripping columns may omit a reboiler at a bottom of the column and instead provide heating requirements and separation impetus from a fluidized inert media such as steam. Reboiled absorber columns may omit a condenser at the top of the column.

As depicted, process flow lines in the drawings can be referred to interchangeably as, e.g., lines, pipes, feeds, gases, products, discharges, parts, portions, or streams.

The term "passing" means that the material passes from a conduit or vessel to an object.

The terms "hydrogen-enriched" and "stream enriched in hydrogen" mean that the hydrogen content/concentration of the product stream is higher than the inlet gas stream. For example, in some embodiments, the product stream may contain greater than 40 mol % hydrogen, or greater than 50 mol %, or greater than 60 mol %, or greater than 70 mol %, or greater than 80 mol %, or greater than 90 mol %, or greater than 95 mol %, or greater than 98 mol %, or greater than 99 mol %, or greater than 99.9 mol %.

The terms "$CO_2$-enriched" and "stream enriched in $CO_2$" mean that the $CO_2$ content/concentration of the product stream is higher than the inlet gas stream. For example, in some embodiments, the product stream may contain greater than 40 mol % $CO_2$, or greater than 50 mol %, or greater than 60 mol %, or greater than 70 mol %, or greater than 80 mol %, or greater than 90 mol %, or greater than 95 mol %, or greater than 98 mol %, or greater than 99 mol %, or greater than 99.9 mol %.

As used herein, the term "about" means within 10% of the value, or within 5%, or within 1%.

Specific Embodiments

While the following is described in conjunction with specific embodiments, it will be understood that this description is intended to illustrate and not limit the scope of the preceding description and the appended claims.

A first embodiment of the invention is a method of producing a hydrogen-enriched product and recovering $CO_2$ comprising processing a feed stream comprising hydrocarbons or a carbonaceous feedstock in a hydrogen production process unit to produce a synthesis gas mixture comprising hydrogen, carbon dioxide, water, and at least one of methane, carbon monoxide, nitrogen, and argon; separating an effluent stream comprising the synthesis gas from the hydrogen production process unit in a hydrogen pressure swing adsorption (PSA) unit into a first high-pressure hydrogen stream enriched in hydrogen and a hydrogen depleted tail gas stream comprising a portion of the hydrogen, the carbon dioxide, the water, and the at least one of the methane, the carbon monoxide, the nitrogen, and the argon; compressing the hydrogen depleted tail gas stream in a compressor to form a compressed tail gas stream; separating the compressed tail gas stream in a $CO_2$ recovery system into a $CO_2$-enriched product stream and an overhead stream comprising the portion of the hydrogen, a portion of the carbon dioxide, and the at least one of the methane, the carbon monoxide, the nitrogen, and the argon; separating the overhead stream from the $CO_2$ recovery system in a PSA system that produces at least two product streams into at least a second high-pressure hydrogen stream enriched in hydrogen, and a low-pressure $CO_2$ stream enriched in carbon dioxide; recovering the second high-pressure hydrogen stream; and optionally recycling the low-pressure $CO_2$ stream to the compressor. An embodiment of the invention is one, any or all of prior embodiments in this paragraph up through the first embodiment in this paragraph wherein the PSA system that produces at least two product streams comprises a three-product PSA unit and wherein separating the overhead stream from the $CO_2$ recovery system comprises introducing the overhead stream into the three-product PSA unit having a three-product PSA cycle; removing the second high-pressure hydrogen stream during a high pressure, co-current adsorption step in the three-product PSA cycle, wherein the second high pressure stream is substantially free of carbon dioxide, methane, carbon monoxide, nitrogen, and argon; removing a second gas stream during a co-current depressurization step in the three-product PSA cycle, the second gas stream comprising the at least one of the methane, the carbon monoxide, the nitrogen and the argon; removing the low-pressure $CO_2$ stream during at least one of a counter-current depressurization step and a counter-current purge step in the three-product PSA cycle; recovering the second high-pressure hydrogen stream; and optionally recycling the low-pressure $CO_2$ stream to the compressor. An embodiment of the invention is one, any or all of prior embodiments in this paragraph up through the first embodiment in this paragraph wherein the PSA system that produces at least two product streams comprises a three-product PSA unit having a three-product PSA cycle comprising a high pressure, co-current adsorption and hydrogen removal step; at least one co-current depressurization step following the high pressure, co-current adsorption step and hydrogen removal step; a co-current depressurization and second gas removal step following the at least one co-current depressurization step; a counter-current blowdown step and $CO_2$ removal step following the intermediate pressure co-current depressurization and second gas removal step; a counter-current purge and $CO_2$ removal step following the counter-current blowdown step; at least one counter-current re-pressurization step following the counter-current purge and $CO_2$ removal step; and optionally a co-current feed re-pressurization step following the at least one counter-current re-pressurization step or a counter-current product re-pressurization following the at least one counter-current re-pressurization step. An embodiment of the invention is one, any or all of prior embodiments in this paragraph up through the first embodiment in this paragraph wherein the PSA system that produces at least two product streams comprises a second PSA unit, and wherein separating the overhead stream from the $CO_2$ recovery system comprises; introducing the overhead stream into the second PSA unit and separating the overhead stream into the low-pressure $CO_2$ stream and the second high-pressure hydrogen stream, wherein the second high-pressure hydrogen stream comprises more than 75% of the hydrogen and a portion of the at least one of the methane, the carbon monoxide, the nitrogen, and the argon; and optionally recycling the low-pressure $CO_2$ stream to the compressor. An embodiment of the invention is one, any or all of prior embodiments in this paragraph up through the first embodiment in this paragraph wherein the PSA system that produces at least two product streams further comprises a third PSA unit, the method further comprising separating the second high-pressure hydrogen stream in the third PSA unit into a third high-pressure hydrogen stream and a second gas stream, wherein the third high-pressure hydrogen stream is substantially free of carbon dioxide, methane, carbon monoxide, nitrogen, and argon, and wherein the second gas stream comprises the at least one of the methane, the carbon monoxide, the nitrogen, and the argon in the overhead stream; and recovering the third high-pressure hydrogen stream. An embodiment of the invention is one, any or all of prior embodiments in this paragraph up through the first embodiment in this paragraph wherein the $CO_2$ recovery system comprises a refrigerated $CO_2$ fractionation process wherein refrigeration cooling is provided by at least two refrigeration circuits wherein one of the refrigeration circuits utilizes a portion of the $CO_2$-enriched product stream recovered from a distillation column in the $CO_2$ recovery system; or a single closed loop multi-component mixed refrigerant circuit. An embodiment of the invention is one, any or all of prior embodiments in this paragraph up through the first embodiment in this paragraph further comprising oxidizing the methane, the carbon monoxide, and any hydrogen in the second gas stream with oxygen in a catalytic oxidation unit to produce water, $CO_2$, and heat; and recycling the $CO_2$ from the catalytic oxidation unit to the compressor. An embodiment of the invention is one, any or all of prior embodiments in this paragraph up through the first embodiment in this paragraph further comprising selectively bypassing the compressor, the $CO_2$ recovery system, and the PSA system that produces at least two product streams, and sending the hydrogen depleted tail gas stream from the hydrogen PSA unit to a combustion unit in the hydrogen production process unit. An embodiment of the invention is one, any or all of prior embodiments in this paragraph up through the first embodiment in this paragraph wherein the hydrogen production process includes a water gas shift (WGS) unit producing a WGS effluent stream and wherein the effluent stream from the hydrogen production process unit comprises the WGS effluent stream, further comprising heat exchanging the WGS effluent stream with a process stream to form a cooled effluent steam and a pre-heated process stream; and recovering waste heat from the cooled effluent stream to generate steam using a process involving a reaction of reversible oligomerization of phosphoric acid. An embodiment of the invention is one, any or all of prior embodiments in this paragraph up through the first embodiment in this paragraph wherein the second high-pressure hydrogen stream has a pressure in the range of about 1,000 kPa to about 6,000 kPa. An embodiment of the invention is one, any or all of prior embodiments in this paragraph up through the first embodiment in this paragraph wherein the low-pressure $CO_2$ stream has a pressure in the range of about 100 kPa to about 250 kPa. An embodiment of the invention is one, any or all of prior embodiments in this paragraph up through the first embodiment in this paragraph wherein the second gas stream has a pressure in the range of about 100 kPa to about 450 kPa. An embodiment of the invention is one, any or all of prior embodiments in this paragraph up through the first embodiment in this paragraph further comprising at least one of recycling at least a portion of the second gas stream to the hydrogen production process unit; recycling at least a portion of the second gas stream to a water gas shift process unit; and sending at least a portion of the second gas stream to a combustion unit. An embodiment of the invention is one, any or all of prior embodiments in this paragraph up through the first embodiment in this paragraph further comprising drying the compressed tail gas stream in a dryer to remove the water; and cooling the dried tail gas stream in a chiller to form a chilled tail gas stream before separating the tail gas stream, and wherein separating the compressed tail gas stream comprises separating the chilled tail gas stream. An embodiment of the invention is one, any or all of prior embodiments in this paragraph up through the first embodiment in this paragraph wherein the dried tail gas stream is cooled to a temperature of about $-20°$ C. to about $-50°$ C. An embodiment of the invention is one, any or all of prior embodiments in this paragraph up through the first embodiment in this paragraph wherein the hydrogen production process unit comprises a new or existing steam reforming unit with an optional gas heated reformer, an autothermal reforming unit with an optional gas heated reformer, a partial oxidation unit, or a gasification unit.

A second embodiment of the invention is a method of producing a hydrogen-enriched product and recovering $CO_2$ comprising processing a feed stream comprising hydrocarbons or a carbonaceous feedstock in a hydrogen production process unit to produce a synthesis gas mixture comprising hydrogen, carbon dioxide, water, and at least one of methane, carbon monoxide, nitrogen, and argon; separating an effluent stream comprising the synthesis gas mixture from the hydrogen production process unit in a hydrogen pressure swing adsorption (PSA) unit into a first high-pressure hydrogen stream enriched in hydrogen and a hydrogen depleted tail gas stream comprising a portion of the hydrogen, the carbon dioxide, the water, and the at least one of the methane, the carbon monoxide, the nitrogen, and the argon; compressing the hydrogen depleted tail gas stream in a compressor to form a compressed tail gas stream; drying the compressed tail gas stream in a dryer to remove the water; cooling the dried tail gas stream in a chiller to a temperature of about $-20°$ C. to about $-50°$ C. to form a chilled tail gas stream; separating the chilled tail gas stream in a $CO_2$ recovery system into a $CO_2$-enriched product stream and an overhead stream comprising the portion of the hydrogen, a portion of the carbon dioxide, and the at least one of the methane, the carbon monoxide, the nitrogen, and the argon; separating the overhead stream from the $CO_2$ recovery system in a PSA system that produces at least two product streams into at least a second high-pressure hydrogen stream enriched in hydrogen, and a low-pressure $CO_2$ stream enriched in carbon dioxide; recovering the second high-pressure hydrogen stream; and recycling the low-pressure $CO_2$ stream to the compressor.

A third embodiment of the invention is an apparatus for producing a hydrogen-enriched product and recovering $CO_2$ comprising a hydrogen production process unit having at least one inlet and at least one outlet; a hydrogen PSA unit having an inlet, a hydrogen outlet, and a tail gas outlet, the hydrogen PSA unit inlet in fluid communication with the hydrogen production process unit outlet; a compressor having an inlet and an outlet, the compressor inlet in fluid communication with the hydrogen PSA tail gas outlet; a dryer having an inlet and at least one outlet, the dryer inlet in fluid communication with the compressor outlet; a chiller having a gas inlet, a gas outlet, a chilling fluid inlet and a chilling fluid outlet, the chiller gas inlet in fluid communication with the dryer outlet, the chiller fluid inlet in fluid communication with a source of chilling fluid; a $CO_2$ recovery system having an inlet, a first outlet, and an overhead outlet, the $CO_2$ recovery system inlet in fluid communication with the chiller gas outlet; and a PSA system having at least an inlet, a high-pressure hydrogen outlet, and a low pressure $CO_2$ outlet, the PSA system inlet in fluid communication with the $CO_2$ recovery system overhead outlet, and the low pressure $CO_2$ outlet in fluid communication with the compressor inlet. An embodiment of the invention is one, any or all of prior embodiments in this paragraph up through the third embodiment in this paragraph wherein the PSA system further comprises a second gas outlet in fluid communication with a combustion unit in the hydrogen production process unit; or wherein the second gas outlet of the PSA system is in fluid communication with an inlet of a catalytic oxidation unit, and an outlet of the catalytic oxidation unit is in fluid communication with the inlet of the compressor. An embodiment of the invention is one, any or all of prior embodiments in this paragraph up through the third embodiment in this paragraph wherein the PSA system comprises a first PSA unit having an inlet and first and second outlets, and a second PSA unit having an inlet and first and second outlets; wherein the inlet of the first PSA unit comprises the inlet of the PSA system; wherein the first outlet of the first PSA unit comprises the low-pressure $CO_2$ outlet; the inlet of the second PSA unit is in fluid communication with the second outlet of the first PSA unit; wherein the first outlet of the second PSA unit comprises the high-pressure hydrogen outlet and the second outlet of the second PSA unit comprises a second gas outlet.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A method of producing a hydrogen-enriched product and recovering $CO_2$ comprising:
    processing a feed stream comprising hydrocarbons or a carbonaceous feedstock in a hydrogen production process unit to produce a synthesis gas mixture comprising hydrogen, carbon dioxide, water, and at least one of methane, carbon monoxide, nitrogen, and argon; separating an effluent stream comprising the synthesis gas from the hydrogen production process unit in a hydrogen pressure swing adsorption (PSA) unit into a first hydrogen stream enriched in hydrogen and a hydrogen depleted tail gas stream comprising a portion of the hydrogen, the carbon dioxide, the water, and the at least one of the methane, the carbon monoxide, the nitrogen, and the argon;
    compressing the hydrogen depleted tail gas stream in a compressor to form a compressed tail gas stream;
    separating the compressed tail gas stream in a $CO_2$ recovery system into a $CO_2$-enriched product stream and an overhead stream comprising the portion of the hydrogen, a portion of the carbon dioxide, and the at least one of the methane, the carbon monoxide, the nitrogen, and the argon;
    separating the overhead stream from the $CO_2$ recovery system in a PSA system that produces at least two product streams into at least a second hydrogen stream enriched in hydrogen, and a $CO_2$ stream enriched in carbon dioxide;
    recovering the second hydrogen stream; and
    optionally recycling the $CO_2$ stream to the compressor.

2. The method of claim 1 wherein the PSA system that produces at least two product streams comprises a three-product PSA unit and wherein separating the overhead stream from the $CO_2$ recovery system comprises:
    introducing the overhead stream into the three-product PSA unit having a three-product PSA cycle;
    removing the second hydrogen stream during a high pressure, co-current adsorption step in the three-product PSA cycle, wherein the second stream is substantially free of carbon dioxide, methane, carbon monoxide, nitrogen, and argon;
    removing a second gas stream during a co-current depressurization step in the three-product PSA cycle, the second gas stream comprising the at least one of the methane, the carbon monoxide, the nitrogen and the argon;
    removing the $CO_2$ stream during at least one of a counter-current depressurization step and a counter-current purge step in the three-product PSA cycle;
    recovering the second hydrogen stream; and
    optionally recycling the $CO_2$ stream to the compressor.

3. The method of claim 2 wherein the PSA system that produces at least two product streams comprises a three-product PSA unit having a three-product PSA cycle comprising:
    a high pressure, co-current adsorption and hydrogen removal step;
    at least one co-current depressurization step following the high pressure, co-current adsorption step and hydrogen removal step;
    a co-current depressurization and second gas removal step following the at least one co-current depressurization step;
    a counter-current blowdown step and $CO_2$ removal step following the co-current depressurization and second gas removal step;
    a counter-current purge and $CO_2$ removal step following the counter-current blowdown step;
    at least one counter-current re-pressurization step following the counter-current purge and $CO_2$ removal step; and
    optionally a co-current feed re-pressurization step following the at least one counter-current re-pressurization step or a counter-current product re-pressurization following the at least one counter-current re-pressurization step.

4. The method of claim 1 wherein the PSA system that produces at least two product streams comprises a second PSA unit, and wherein separating the overhead stream from the $CO_2$ recovery system comprises;

introducing the overhead stream into the second PSA unit and separating the overhead stream into the $CO_2$ stream and the second hydrogen stream, wherein the second hydrogen stream comprises more than 75% of the hydrogen and a portion of the at least one of the methane, the carbon monoxide, the nitrogen, and the argon; and optionally recycling the $CO_2$ stream to the compressor.

5. The method of claim 4 wherein the PSA system that produces at least two product streams further comprises a third PSA unit, the method further comprising:

separating the second hydrogen stream in the third PSA unit into a third hydrogen stream and a second gas stream, wherein the third hydrogen stream is substantially free of carbon dioxide, methane, carbon monoxide, nitrogen, and argon, and wherein the second gas stream comprises the at least one of the methane, the carbon monoxide, the nitrogen, and the argon in the overhead stream; and recovering the third hydrogen stream.

6. The method of claim 1 wherein the $CO_2$ recovery system comprises a refrigerated $CO_2$ fractionation process wherein refrigeration cooling is provided by:

at least two refrigeration circuits wherein one of the refrigeration circuits utilizes a portion of the $CO_2$-enriched product stream recovered from a distillation column in the $CO_2$ recovery system; or a single closed loop multi-component mixed refrigerant circuit.

7. The method of claim 1 further comprising:

oxidizing the methane, the carbon monoxide, and any hydrogen in the second gas stream with oxygen in a catalytic oxidation unit to produce water, $CO_2$, and heat; and recycling the $CO_2$ from the catalytic oxidation unit to the compressor.

8. The method of claim 1 further comprising:

selectively bypassing the compressor, the $CO_2$ recovery system, and the PSA system that produces at least two product streams, and sending the hydrogen depleted tail gas stream from the hydrogen PSA unit to a combustion unit in the hydrogen production process unit.

9. The method of claim 1 wherein the hydrogen production process includes a water gas shift (WGS) unit producing a WGS effluent stream and wherein the effluent stream from the hydrogen production process unit comprises the WGS effluent stream, further comprising:

heat exchanging the WGS effluent stream with a process stream to form a cooled effluent steam and a pre-heated process stream; and recovering waste heat from the cooled effluent stream to generate steam using a process involving a reaction of reversible oligomerization of phosphoric acid.

10. The method of claim 1 wherein the second stream has a pressure in the range of about 1,000 kPa to about 6,000 kPa.

11. The method of claim 1 wherein the $CO_2$ stream has a pressure in the range of about 100 kPa to about 250 kPa.

12. The method of claim 2 wherein the second gas stream has a pressure in the range of about 100 kPa to about 450 kPa.

13. The method of claim 5 further comprising at least one of:

recycling at least a portion of the second gas stream to the hydrogen production process unit;

recycling at least a portion of the second gas stream to a water gas shift process unit; and sending at least a portion of the second gas stream to a combustion unit.

14. The method of claim 1 further comprising:

drying the compressed tail gas stream in a dryer to remove the water; and cooling the dried tail gas stream in a chiller to form a chilled tail gas stream before separating the tail gas stream, and wherein separating the compressed tail gas stream comprises separating the chilled tail gas stream.

15. The method of claim 14 wherein the dried tail gas stream is cooled to a temperature of about −20° C. to about −50° C.

16. The method of claim 1 wherein the hydrogen production process unit comprises a new or existing steam reforming unit with an optional gas heated reformer, an autothermal reforming unit with an optional gas heated reformer, a partial oxidation unit, or a gasification unit.

17. A method of producing a hydrogen-enriched product and recovering $CO_2$ comprising:

processing a feed stream comprising hydrocarbons or a carbonaceous feedstock in a hydrogen production process unit to produce a synthesis gas mixture comprising hydrogen, carbon dioxide, water, and at least one of methane, carbon monoxide, nitrogen, and argon;

separating an effluent stream comprising the synthesis gas mixture from the hydrogen production process unit in a hydrogen pressure swing adsorption (PSA) unit into a first hydrogen stream enriched in hydrogen and a hydrogen depleted tail gas stream comprising a portion of the hydrogen, the carbon dioxide, the water, and the at least one of the methane, the carbon monoxide, the nitrogen, and the argon;

compressing the hydrogen depleted tail gas stream in a compressor to form a compressed tail gas stream;

drying the compressed tail gas stream in a dryer to remove the water;

cooling the dried tail gas stream in a chiller to a temperature of about −20° C. to about −50° C. to form a chilled tail gas stream;

separating the chilled tail gas stream in a $CO_2$ recovery system into a $CO_2$-enriched product stream and an overhead stream comprising the portion of the hydrogen, a portion of the carbon dioxide, and the at least one of the methane, the carbon monoxide, the nitrogen, and the argon;

separating the overhead stream from the $CO_2$ recovery system in a PSA system that produces at least two product streams into at least a second hydrogen stream enriched in hydrogen, and a $CO_2$ stream enriched in carbon dioxide;

recovering the second hydrogen stream; and recycling the $CO_2$ stream to the compressor.

18. An apparatus for producing a hydrogen-enriched product and recovering $CO_2$ comprising:

a hydrogen production process unit having at least one inlet and at least one outlet;

a hydrogen PSA unit having an inlet, a hydrogen outlet, and a tail gas outlet, the hydrogen PSA unit inlet in fluid communication with the hydrogen production process unit outlet;

a compressor having an inlet and an outlet, the compressor inlet in fluid communication with the hydrogen PSA tail gas outlet;

a dryer having an inlet and at least one outlet, the dryer inlet in fluid communication with the compressor outlet;

a chiller having a gas inlet, a gas outlet, a chilling fluid inlet and a chilling fluid outlet, the chiller gas inlet in fluid communication with the dryer outlet, the chiller fluid inlet in fluid communication with a source of chilling fluid;

a $CO_2$ recovery system having an inlet, a first outlet, and an overhead outlet, the $CO_2$ recovery system inlet in fluid communication with the chiller gas outlet; and a PSA system having at least an inlet, a hydrogen outlet, and a $CO_2$ outlet, the PSA system inlet in fluid communication with the $CO_2$ recovery system overhead outlet, and the $CO_2$ outlet in fluid communication with the compressor inlet.

19. The apparatus of claim 18:

wherein the PSA system further comprises a second gas outlet in fluid communication with a combustion unit in the hydrogen production process unit; or wherein the second gas outlet of the PSA system is in fluid communication with an inlet of a catalytic oxidation unit, and an outlet of the catalytic oxidation unit is in fluid communication with the inlet of the compressor.

20. The apparatus of claim 18:

wherein the PSA system comprises a first PSA unit having an inlet and first and second outlets, and a second PSA unit having an inlet and first and second outlets;

wherein the inlet of the first PSA unit comprises the inlet of the PSA system;

wherein the first outlet of the first PSA unit comprises the $CO_2$ outlet;

the inlet of the second PSA unit is in fluid communication with the second outlet of the first PSA unit;

wherein the first outlet of the second PSA unit comprises the hydrogen outlet and the second outlet of the second PSA unit comprises a second gas outlet.

\* \* \* \* \*